(12) United States Patent
Jerding et al.

(10) Patent No.: US 7,975,277 B1
(45) Date of Patent: Jul. 5, 2011

(54) SYSTEM FOR PROVIDING ALTERNATIVE SERVICES

(76) Inventors: Dean F. Jerding, Roswell, GA (US);
Arturo A. Rodriguez, Norcross, GA (US)

( * ) Notice: Subject to any disclaimer, the term of this patent is extended or adjusted under 35 U.S.C. 154(b) by 0 days.

(21) Appl. No.: 09/542,484

(22) Filed: Apr. 3, 2000

(51) Int. Cl.
*H04N 7/16* (2006.01)
*H04N 7/167* (2006.01)
*H04N 7/173* (2006.01)

(52) U.S. Cl. ............................. 725/25; 725/31; 725/93

(58) Field of Classification Search .................. 725/1–8, 725/25–31, 38, 39–55, 93
See application file for complete search history.

(56) References Cited

U.S. PATENT DOCUMENTS

| | | |
|---|---|---|
| 3,676,580 A | 7/1972 | Beck |
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,477,262 A | 12/1995 | Banker et al. |

(Continued)

FOREIGN PATENT DOCUMENTS

CA 2 363 052 A1 11/1995

(Continued)

OTHER PUBLICATIONS

U.S. Appl. No. 09/693,288 filed Oct. 20, 2000 entitled "Media-on-Demand Rental Duration Management System".

(Continued)

*Primary Examiner* — Hunter B. Lonsberry
(74) *Attorney, Agent, or Firm* — Merchant & Gould, P.C.

(57) ABSTRACT

The present invention provides a system for providing alternative services in a television system. In one implementation, a subscriber is provided an alternative service upon attempting to access an unauthorized service, thereby providing a framework for efficient control of conditional access and enhanced services. In addition, in one implementation, user device limitations or variations are handled conveniently through the same multi-purpose system for providing alternative services.

34 Claims, 7 Drawing Sheets

SERVICE INFORMATION ON SAM DATABASE

U.S. PATENT DOCUMENTS

| | | | |
|---|---|---|---|
| 5,479,268 A | 12/1995 | Young et al. | |
| 5,481,542 A | 1/1996 | Logston et al. | |
| 5,483,277 A | 1/1996 | Granger | |
| 5,485,216 A | 1/1996 | Lee | |
| 5,493,638 A | 2/1996 | Hooper et al. | |
| 5,508,815 A | 4/1996 | Levine | |
| 5,512,958 A | 4/1996 | Rzeszewski | |
| 5,515,495 A | 5/1996 | Ikemoto | |
| 5,521,631 A | 5/1996 | Budow et al. | |
| 5,530,754 A | 6/1996 | Garfinkle | |
| 5,532,735 A | 7/1996 | Blahut et al. | |
| 5,532,754 A | 7/1996 | Young et al. | |
| 5,544,354 A | 8/1996 | May et al. | |
| 5,555,441 A | 9/1996 | Haddad | |
| 5,557,541 A | 9/1996 | Schulhof et al. | |
| 5,562,732 A | 10/1996 | Eisenberg | |
| 5,568,272 A | 10/1996 | Levine | |
| 5,583,560 A | 12/1996 | Florin et al. | |
| 5,583,995 A | 12/1996 | Gardner et al. | |
| 5,585,821 A | 12/1996 | Ishikura et al. | |
| 5,585,838 A | 12/1996 | Lawler et al. | |
| 5,589,892 A | 12/1996 | Knee et al. | |
| 5,592,551 A | 1/1997 | Lett et al. | |
| 5,594,509 A | 1/1997 | Florin et al. | |
| 5,598,524 A | 1/1997 | Johnston, Jr. et al. | |
| 5,600,364 A | 2/1997 | Hendricks et al. | |
| 5,600,573 A | 2/1997 | Hendricks et al. | |
| 5,614,940 A | 3/1997 | Cobbley et al. | |
| 5,619,247 A | 4/1997 | Russo | |
| 5,619,249 A | 4/1997 | Billock et al. | |
| 5,621,456 A | 4/1997 | Florin et al. | |
| 5,623,613 A | 4/1997 | Rowe et al. | |
| 5,625,405 A | 4/1997 | DuLac et al. | |
| 5,625,864 A | 4/1997 | Budow et al. | |
| 5,629,732 A | 5/1997 | Moskowitz et al. | |
| 5,631,693 A | 5/1997 | Wunderlich et al. | |
| 5,632,681 A | 5/1997 | Bakoglu et al. | |
| 5,635,979 A | 6/1997 | Kostreski et al. | |
| 5,635,980 A | 6/1997 | Lin et al. | |
| 5,635,989 A | 6/1997 | Rothmuller | |
| 5,650,831 A | 7/1997 | Farwell | |
| 5,659,350 A | 8/1997 | Hendricks et al. | |
| 5,664,133 A | 9/1997 | Malamud | |
| 5,666,293 A | 9/1997 | Metz et al. | |
| 5,671,411 A | 9/1997 | Watts et al. | |
| 5,675,752 A | 10/1997 | Scott et al. | |
| 5,682,206 A | 10/1997 | Wehmeyer et al. | |
| 5,682,597 A | 10/1997 | Ganek et al. | |
| 5,684,918 A | 11/1997 | Abecassis | |
| 5,686,954 A | 11/1997 | Yoshinobu et al. | |
| 5,687,331 A | 11/1997 | Volk et al. | |
| 5,689,641 A | 11/1997 | Ludwig et al. | |
| 5,694,176 A | 12/1997 | Bruette et al. | |
| 5,694,546 A | 12/1997 | Reisman | |
| 5,699,107 A | 12/1997 | Lawler et al. | |
| 5,715,169 A | 2/1998 | Noguchi | |
| 5,715,515 A | 2/1998 | Akins, III et al. | |
| 5,721,827 A | 2/1998 | Logan et al. | |
| 5,721,829 A | 2/1998 | Dunn et al. | |
| 5,721,897 A | 2/1998 | Rubinstein | |
| 5,724,106 A | 3/1998 | Autry et al. | |
| 5,724,521 A | 3/1998 | Dedrick | |
| 5,724,646 A | 3/1998 | Ganek et al. | |
| 5,727,060 A | 3/1998 | Young | |
| 5,729,549 A | 3/1998 | Kostreski et al. | |
| 5,732,216 A | 3/1998 | Logan et al. | |
| 5,734,853 A | 3/1998 | Hendricks et al. | |
| 5,737,028 A | 4/1998 | Bertram et al. | |
| 5,740,304 A | 4/1998 | Katsuyama et al. | |
| 5,740,549 A | 4/1998 | Reilly et al. | |
| 5,745,837 A | 4/1998 | Fuhrmann | |
| 5,748,493 A | 5/1998 | Lightfoot et al. | |
| 5,751,282 A | 5/1998 | Girard et al. | |
| 5,752,160 A | 5/1998 | Dunn | |
| 5,754,773 A | 5/1998 | Ozden et al. | |
| 5,764,873 A | 6/1998 | Magid et al. | |
| 5,764,899 A | 6/1998 | Eggleston et al. | |
| 5,771,435 A | 6/1998 | Brown | |
| 5,774,170 A | 6/1998 | Hite et al. | |
| 5,778,077 A | 7/1998 | Davidson | |
| 5,790,170 A | 8/1998 | Suzuki | |
| 5,790,176 A | 8/1998 | Craig | |
| 5,790,935 A | 8/1998 | Payton | |
| 5,790,940 A | 8/1998 | Laborde et al. | |
| 5,796,828 A | 8/1998 | Tsukamoto et al. | |
| 5,798,785 A | 8/1998 | Hendricks et al. | |
| 5,799,063 A | 8/1998 | Krane | |
| 5,801,747 A | 9/1998 | Bedard | |
| 5,801,787 A | 9/1998 | Schein et al. | |
| 5,802,502 A | 9/1998 | Gell et al. | |
| 5,808,608 A | 9/1998 | Young et al. | |
| 5,808,611 A | 9/1998 | Johnson et al. | |
| 5,809,204 A | 9/1998 | Young et al. | |
| 5,812,123 A | 9/1998 | Rowe et al. | |
| 5,812,124 A | 9/1998 | Eick et al. | |
| 5,812,786 A | 9/1998 | Seazholtz et al. | |
| 5,822,123 A | 10/1998 | Davis et al. | |
| 5,826,110 A | 10/1998 | Ozden et al. | |
| 5,828,419 A | 10/1998 | Bruette et al. | |
| 5,828,845 A | 10/1998 | Jagadish et al. | |
| 5,835,843 A | 11/1998 | Haddad | |
| 5,838,314 A | 11/1998 | Neel et al. | |
| 5,844,620 A | 12/1998 | Coleman et al. | |
| 5,848,352 A | 12/1998 | Dougherty et al. | |
| 5,850,218 A * | 12/1998 | LaJoie et al. | 725/45 |
| 5,856,975 A | 1/1999 | Rostoker et al. | |
| 5,859,641 A | 1/1999 | Cave | |
| 5,861,906 A | 1/1999 | Dunn et al. | |
| 5,877,756 A | 3/1999 | Um | |
| 5,880,768 A | 3/1999 | Lemmons et al. | |
| 5,886,690 A | 3/1999 | Pond et al. | |
| 5,886,732 A | 3/1999 | Humpleman | |
| 5,895,454 A | 4/1999 | Harrington | |
| 5,898,456 A | 4/1999 | Wahl | |
| 5,900,905 A | 5/1999 | Shoff et al. | |
| 5,905,522 A | 5/1999 | Lawler | |
| 5,905,942 A | 5/1999 | Stoel et al. | |
| 5,907,323 A | 5/1999 | Lawler et al. | |
| 5,913,040 A | 6/1999 | Rakavy et al. | |
| 5,914,712 A | 6/1999 | Sartain et al. | |
| 5,914,746 A | 6/1999 | Matthews, III et al. | |
| 5,915,068 A | 6/1999 | Levine | |
| 5,917,822 A | 6/1999 | Lyles et al. | |
| 5,929,849 A | 7/1999 | Kikinis | |
| 5,930,493 A | 7/1999 | Ottesen et al. | |
| 5,935,206 A | 8/1999 | Dixon et al. | |
| 5,936,659 A | 8/1999 | Viswanathan | |
| 5,940,073 A | 8/1999 | Klosterman et al. | |
| 5,943,047 A | 8/1999 | Suzuki | |
| 5,956,024 A | 9/1999 | Strickland et al. | |
| 5,956,716 A | 9/1999 | Kenner et al. | 707/10 |
| 5,960,411 A | 9/1999 | Hartman et al. | |
| 5,961,603 A | 10/1999 | Kunkel et al. | |
| 5,969,748 A | 10/1999 | Casement et al. | |
| 5,978,043 A | 11/1999 | Blonstein et al. | |
| 5,983,273 A | 11/1999 | White et al. | |
| 5,986,650 A | 11/1999 | Ellis et al. | |
| 5,987,256 A | 11/1999 | Wu et al. | |
| 5,990,677 A | 11/1999 | Pietraszak et al. | |
| 5,990,881 A | 11/1999 | Inoue et al. | |
| 5,990,890 A | 11/1999 | Etheredge | |
| 5,990,927 A | 11/1999 | Hendricks et al. | |
| 5,995,134 A | 11/1999 | Hayashi | |
| 6,002,401 A | 12/1999 | Baker | |
| 6,005,565 A | 12/1999 | Legall et al. | |
| 6,005,631 A | 12/1999 | Anderson et al. | |
| 6,006,257 A | 12/1999 | Slezak | |
| 6,008,803 A | 12/1999 | Rowe et al. | |
| 6,008,836 A | 12/1999 | Bruck et al. | |
| 6,014,184 A | 1/2000 | Knee et al. | |
| 6,014,694 A | 1/2000 | Aharoni et al. | |
| 6,016,348 A | 1/2000 | Blatter et al. | |
| 6,018,359 A | 1/2000 | Kermode | |
| 6,018,372 A | 1/2000 | Etheredge | |
| 6,020,912 A * | 2/2000 | De Lang | 725/91 |
| 6,023,267 A | 2/2000 | Chapuis et al. | |
| 6,025,837 A | 2/2000 | Matthews, III et al. | |

| Patent No. | Type | Date | Inventor(s) | Class |
|---|---|---|---|---|
| 6,025,868 | A | 2/2000 | Russo | |
| 6,025,869 | A | 2/2000 | Stas et al. | |
| 6,026,376 | A | 2/2000 | Kenney | |
| 6,035,281 | A | 3/2000 | Crosskey et al. | |
| 6,037,933 | A | 3/2000 | Blonstein et al. | |
| 6,049,831 | A | 4/2000 | Gardell et al. | |
| 6,057,872 | A | 5/2000 | Candelore | |
| 6,061,097 | A | 5/2000 | Satterfield | |
| 6,064,380 | A | 5/2000 | Swenson et al. | |
| 6,064,980 | A | 5/2000 | Jacobi et al. | |
| 6,070,186 | A | 5/2000 | Nishio | |
| 6,072,982 | A | 6/2000 | Haddad | |
| 6,073,105 | A | 6/2000 | Sutcliffe et al. | |
| 6,075,575 | A | 6/2000 | Schein et al. | |
| 6,081,263 | A | 6/2000 | LeGall et al. | |
| 6,085,185 | A | 7/2000 | Matsuzawa et al. | |
| 6,094,680 | A | 7/2000 | Hokanson | |
| 6,097,383 | A | 8/2000 | Gaughan et al. | |
| 6,098,082 | A | 8/2000 | Gibbon et al. | |
| 6,101,512 | A | 8/2000 | DeRose et al. | |
| 6,108,002 | A | 8/2000 | Ishizaki | |
| 6,108,042 | A | 8/2000 | Adams et al. | |
| 6,118,445 | A | 9/2000 | Nonomura et al. | |
| 6,118,976 | A | 9/2000 | Arias et al. | |
| 6,124,878 | A | 9/2000 | Adams et al. | |
| 6,125,259 | A * | 9/2000 | Perlman | 725/28 |
| 6,133,909 | A | 10/2000 | Schein et al. | |
| 6,137,539 | A | 10/2000 | Lownes et al. | |
| 6,138,139 | A | 10/2000 | Beck et al. | |
| 6,141,003 | A | 10/2000 | Chor et al. | |
| 6,141,488 | A | 10/2000 | Knudson et al. | |
| 6,148,332 | A | 11/2000 | Brewer et al. | |
| 6,151,059 | A | 11/2000 | Schein et al. | |
| 6,157,377 | A * | 12/2000 | Shah-Nazaroff et al. | 345/719 |
| 6,157,413 | A | 12/2000 | Hanafee et al. | |
| 6,160,546 | A | 12/2000 | Thompson et al. | |
| 6,160,989 | A | 12/2000 | Hendricks et al. | |
| 6,163,272 | A | 12/2000 | Goode et al. | |
| 6,166,730 | A | 12/2000 | Goode et al. | |
| 6,169,543 | B1 | 1/2001 | Wehmeyer | |
| 6,172,674 | B1 | 1/2001 | Etheredge | |
| 6,172,677 | B1 | 1/2001 | Stautner et al. | |
| 6,177,931 | B1 | 1/2001 | Alexander et al. | |
| 6,181,333 | B1 | 1/2001 | Chaney et al. | |
| 6,181,693 | B1 | 1/2001 | Maresca | |
| 6,182,287 | B1 | 1/2001 | Schneidewend et al. | |
| 6,184,877 | B1 | 2/2001 | Dodson et al. | |
| 6,188,684 | B1 | 2/2001 | Setoyama et al. | |
| 6,195,689 | B1 | 2/2001 | Bahlmann | |
| 6,201,540 | B1 | 3/2001 | Gallup et al. | |
| 6,205,485 | B1 | 3/2001 | Kikinis | |
| 6,208,335 | B1 | 3/2001 | Gordon et al. | |
| 6,209,130 | B1 | 3/2001 | Rector et al. | |
| 6,216,264 | B1 | 4/2001 | Maze et al. | |
| 6,238,290 | B1 | 5/2001 | Tarr et al. | |
| 6,239,845 | B1 | 5/2001 | Itagaki et al. | |
| 6,240,555 | B1 | 5/2001 | Shoff et al. | |
| 6,243,142 | B1 | 6/2001 | Mugura et al. | |
| 6,249,532 | B1 | 6/2001 | Yoshikawa et al. | |
| 6,253,375 | B1 | 6/2001 | Gordon et al. | |
| 6,259,733 | B1 | 7/2001 | Kaye et al. | |
| 6,266,814 | B1 | 7/2001 | Lemmons et al. | |
| 6,268,849 | B1 | 7/2001 | Boyer et al. | |
| 6,272,484 | B1 | 8/2001 | Martin et al. | |
| 6,275,268 | B1 | 8/2001 | Ellis et al. | |
| 6,282,713 | B1 | 8/2001 | Kitsukawa et al. | |
| 6,289,346 | B1 | 9/2001 | Milewski et al. | |
| 6,289,514 | B1 | 9/2001 | Link et al. | |
| 6,292,624 | B1 | 9/2001 | Saib et al. | |
| 6,305,019 | B1 | 10/2001 | Dyer et al. | |
| 6,311,011 | B1 | 10/2001 | Kuroda | |
| 6,314,572 | B1 | 11/2001 | LaRocca et al. | |
| 6,314,573 | B1 | 11/2001 | Gordon et al. | |
| 6,314,575 | B1 * | 11/2001 | Billock et al. | 725/87 |
| 6,317,777 | B1 | 11/2001 | Skarbo et al. | |
| 6,317,885 | B1 | 11/2001 | Fries | |
| 6,323,911 | B1 | 11/2001 | Schein et al. | |
| 6,327,628 | B1 | 12/2001 | Anuff et al. | |
| 6,335,936 | B1 | 1/2002 | Bossemeyer, Jr. et al. | |
| 6,347,400 | B1 | 2/2002 | Ohkura et al. | |
| 6,349,410 | B1 | 2/2002 | Lortz | |
| 6,353,448 | B1 | 3/2002 | Scarborough et al. | |
| 6,357,046 | B1 | 3/2002 | Thompson et al. | |
| 6,359,636 | B1 | 3/2002 | Schindler et al. | |
| 6,360,367 | B1 * | 3/2002 | Yamamoto | 725/25 |
| 6,362,841 | B1 | 3/2002 | Nykanen | |
| 6,367,078 | B1 | 4/2002 | Lasky | |
| 6,378,130 | B1 | 4/2002 | Adams | |
| 6,381,332 | B1 * | 4/2002 | Glaab | 380/210 |
| 6,385,614 | B1 | 5/2002 | Vellandi | |
| 6,393,585 | B1 | 5/2002 | Houha et al. | |
| 6,396,549 | B1 | 5/2002 | Weber | |
| 6,400,280 | B1 | 6/2002 | Osakabe | |
| 6,401,243 | B1 | 6/2002 | Suzuki | |
| 6,405,239 | B1 | 6/2002 | Addington et al. | |
| 6,421,067 | B1 | 7/2002 | Kamen et al. | |
| 6,429,899 | B1 | 8/2002 | Nio et al. | |
| 6,434,748 | B1 | 8/2002 | Shen et al. | |
| 6,441,862 | B1 | 8/2002 | Yuen et al. | |
| 6,442,332 | B1 | 8/2002 | Knudson et al. | |
| 6,442,755 | B1 | 8/2002 | Lemmons et al. | |
| 6,442,756 | B1 | 8/2002 | Durden et al. | |
| 6,446,261 | B1 | 9/2002 | Rosser | |
| 6,446,262 | B1 | 9/2002 | Malaure et al. | |
| 6,460,181 | B1 | 10/2002 | Donnelly | |
| 6,463,585 | B1 | 10/2002 | Hendricks et al. | |
| 6,476,833 | B1 | 11/2002 | Moshfeghi | |
| 6,480,669 | B1 | 11/2002 | Tsumagari et al. | |
| 6,481,010 | B2 | 11/2002 | Nishikawa et al. | |
| 6,481,011 | B1 | 11/2002 | Lemmons | |
| 6,486,920 | B2 | 11/2002 | Arai et al. | |
| 6,501,902 | B1 | 12/2002 | Wang | |
| 6,505,348 | B1 | 1/2003 | Knowles et al. | |
| 6,507,949 | B1 | 1/2003 | Jonason et al. | |
| 6,510,556 | B1 | 1/2003 | Kusaba et al. | |
| 6,515,680 | B1 | 2/2003 | Hendricks et al. | |
| 6,515,710 | B1 | 2/2003 | Koshimuta | |
| 6,519,770 | B2 * | 2/2003 | Ford | 725/28 |
| 6,526,575 | B1 | 2/2003 | McCoy et al. | |
| 6,526,577 | B1 | 2/2003 | Knudson et al. | |
| 6,532,589 | B1 | 3/2003 | Proehl et al. | |
| 6,536,041 | B1 | 3/2003 | Knudson et al. | |
| 6,539,548 | B1 | 3/2003 | Hendricks et al. | |
| 6,543,053 | B1 | 4/2003 | Li et al. | |
| 6,545,669 | B1 | 4/2003 | Kinawi et al. | |
| 6,557,030 | B1 | 4/2003 | Hoang | |
| 6,563,515 | B1 | 5/2003 | Reynolds et al. | |
| 6,564,378 | B1 | 5/2003 | Satterfield et al. | |
| 6,564,379 | B1 | 5/2003 | Knudson et al. | |
| 6,564,383 | B1 | 5/2003 | Combs et al. | |
| 6,571,390 | B1 | 5/2003 | Dunn et al. | |
| 6,574,793 | B1 | 6/2003 | Ngo et al. | |
| 6,578,077 | B1 | 6/2003 | Rakoshitz et al. | |
| 6,594,699 | B1 | 7/2003 | Sahai et al. | |
| 6,594,825 | B1 | 7/2003 | Goldschmidt Iki et al. | |
| 6,600,496 | B1 | 7/2003 | Wagner et al. | |
| 6,604,240 | B2 | 8/2003 | Ellis et al. | |
| 6,609,253 | B1 | 8/2003 | Swix et al. | |
| 6,611,958 | B1 | 8/2003 | Shintani et al. | |
| 6,614,440 | B1 | 9/2003 | Bowen et al. | |
| 6,614,988 | B1 | 9/2003 | Sampsell | |
| 6,628,302 | B2 | 9/2003 | White et al. | |
| 6,631,413 | B1 | 10/2003 | Aggarwal et al. | |
| 6,642,939 | B1 | 11/2003 | Vallone et al. | |
| 6,647,548 | B1 | 11/2003 | Lu et al. | |
| 6,651,044 | B1 | 11/2003 | Stoneman | |
| 6,662,365 | B1 | 12/2003 | Sullivan et al. | |
| 6,665,869 | B1 | 12/2003 | Ellis et al. | |
| 6,671,328 | B1 | 12/2003 | Poon et al. | |
| 6,675,384 | B1 * | 1/2004 | Block et al. | 725/28 |
| 6,675,385 | B1 | 1/2004 | Wang | |
| 6,678,891 | B1 | 1/2004 | Wilcox et al. | |
| 6,681,395 | B1 | 1/2004 | Nishi | |
| 6,681,396 | B1 | 1/2004 | Bates et al. | |
| 6,684,025 | B1 | 1/2004 | Perlman | |
| 6,684,400 | B1 | 1/2004 | Goode et al. | |
| 6,697,376 | B1 | 2/2004 | Son et al. | |
| 6,698,023 | B2 | 2/2004 | Levitan | |

| Patent/Pub No. | Date | Name |
|---|---|---|
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan et al. |
| 6,718,552 B1 | 4/2004 | Goode |
| 6,725,461 B1 | 4/2004 | Dougherty et al. |
| 6,731,310 B2 | 5/2004 | Craycroft et al. |
| 6,732,367 B1 | 5/2004 | Ellis et al. |
| 6,732,369 B1 | 5/2004 | Schein et al. |
| 6,732,372 B2 * | 5/2004 | Tomita et al. ............ 725/47 |
| 6,735,572 B2 | 5/2004 | Landesmann |
| 6,738,982 B1 | 5/2004 | Jerding |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,957,386 B2 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,990,676 B1 | 1/2006 | Proehl et al. |
| 6,993,782 B1 * | 1/2006 | Newberry et al. ............ 725/39 |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,076,734 B2 | 7/2006 | Wolff et al. |
| 7,086,077 B2 | 8/2006 | Giammaressi |
| 7,103,903 B1 | 9/2006 | Kydd |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,150,031 B1 | 12/2006 | Rodriguez et al. |
| 7,155,733 B2 | 12/2006 | Rodriguez et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,934,232 B1 | 4/2011 | Jerding et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0027561 A1 * | 10/2001 | White et al. ............ 725/1 |
| 2001/0029523 A1 | 10/2001 | Mcternan et al. |
| 2001/0030667 A1 | 10/2001 | Kelts |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0128908 A1 | 9/2002 | Levin et al. |
| 2002/0129362 A1 | 9/2002 | Chang et al. |
| 2003/0002862 A1 | 1/2003 | Rodriguez et al. |
| 2003/0014753 A1 | 1/2003 | Beach et al. |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079227 A1 | 4/2003 | Knowles et al. |
| 2003/0088272 A1 | 5/2003 | Maissel et al. |
| 2003/0101451 A1 | 5/2003 | Bentolila et al. |
| 2003/0101454 A1 | 5/2003 | Ozer et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |

| | | | | | | |
|---|---|---|---|---|---|---|
| 2005/0138657 A1 | 6/2005 | Leftwich | EP | 0 701 756 B1 | 12/1999 | |
| 2005/0155056 A1 | 7/2005 | Knee et al. | EP | 0 989 751 A2 | 3/2000 | |
| 2005/0160468 A1 | 7/2005 | Rodriguez et al. | EP | 1 069 801 A1 | 1/2001 | |
| 2005/0188415 A1 | 8/2005 | Riley | EP | 1 075 143 A1 | 2/2001 | |
| 2005/0204387 A1 | 9/2005 | Knudson et al. | EP | 1 111 572 A2 | 6/2001 | |
| 2005/0204388 A1 | 9/2005 | Knudson et al. | EP | 1 161 085 A1 | 12/2001 | |
| 2005/0213506 A1 | 9/2005 | Wakumoto et al. | GB | 2 343 051 A | 4/2000 | |
| 2005/0216936 A1 | 9/2005 | Knudson et al. | JP | 8-289219 | 11/1996 | |
| 2005/0240961 A1 | 10/2005 | Jerding et al. | JP | 9-322022 | 12/1997 | |
| 2005/0251822 A1 | 11/2005 | Knowles et al. | JP | 10-143734 | 5/1998 | |
| 2005/0278741 A1 | 12/2005 | Robarts et al. | JP | 11-73361 | 3/1999 | |
| 2005/0283797 A1 | 12/2005 | Eldering et al. | JP | 11-073394 | 3/1999 | |
| 2005/0283810 A1 | 12/2005 | Ellis et al. | JP | 11-164284 | 6/1999 | |
| 2005/0289618 A1 | 12/2005 | Hardin | JP | 2000-101941 | 4/2000 | |
| 2006/0020982 A1 | 1/2006 | Jerding et al. | WO | WO 92/22983 | 12/1992 | |
| 2006/0026080 A1 | 2/2006 | Rodriguez et al. | WO | WO 94/14284 | 6/1994 | |
| 2006/0026665 A1 | 2/2006 | Rodriguez et al. | WO | WO 96/17467 | 6/1996 | |
| 2006/0059525 A1 | 3/2006 | Jerding et al. | WO | WO 96/33579 | 10/1996 | |
| 2006/0070107 A1 | 3/2006 | Renkis | WO | WO 96/34486 | 10/1996 | |
| 2006/0088105 A1 | 4/2006 | Shen et al. | WO | WO 96/34491 | 10/1996 | |
| 2006/0112434 A1 | 5/2006 | Banker et al. | WO | WO 96/41477 | 12/1996 | |
| 2006/0206913 A1 | 9/2006 | Jerding et al. | WO | WO 96/41478 | 12/1996 | |
| 2006/0271933 A1 | 11/2006 | Agassi et al. | WO | WO 97/34414 | 9/1997 | |
| 2006/0271964 A1 | 11/2006 | Rodriguez et al. | WO | WO 98/03012 | 1/1998 | |
| 2006/0271973 A1 | 11/2006 | Jerding et al. | WO | WO 98/26528 | 6/1998 | |
| 2007/0019670 A1 | 1/2007 | Falardeau | WO | WO 98/31116 | 7/1998 | |
| 2007/0053293 A1 | 3/2007 | McDonald et al. | WO | WO 98/37695 | 8/1998 | |
| 2007/0094690 A1 | 4/2007 | Rodriguez et al. | WO | WO 98/39893 | 9/1998 | |
| 2007/0136748 A1 | 6/2007 | Rodriguez et al. | WO | WO 98/47279 | 10/1998 | |
| 2007/0186240 A1 | 8/2007 | Ward, III et al. | WO | WO 98/48566 | 10/1998 | |
| 2008/0010658 A1 | 1/2008 | Abbott et al. | WO | WO 98/56172 | 12/1998 | |
| 2008/0098421 A1 | 4/2008 | Rodriguez et al. | WO | WO 98/56173 | 12/1998 | |
| 2008/0098422 A1 | 4/2008 | Rodriguez et al. | WO | WO 98/56188 | 12/1998 | |
| 2008/0101460 A1 | 5/2008 | Rodriguez | WO | WO 99/01984 | 1/1999 | |
| 2008/0104637 A1 | 5/2008 | Rodriguez et al. | WO | WO 99/04560 | 1/1999 | |
| 2008/0137755 A1 | 6/2008 | Onur et al. | WO | WO 99/04561 | 1/1999 | |
| 2008/0155631 A1 | 6/2008 | Liwerant et al. | WO | WO 99/12109 | 3/1999 | |
| 2008/0229361 A1 | 9/2008 | Jerding et al. | WO | WO 99/14947 | 3/1999 | |
| 2008/0279217 A1 | 11/2008 | McDonald et al. | WO | WO 99/35831 | 7/1999 | |
| 2008/0281968 A1 | 11/2008 | Rodriguez | WO | WO 99/45701 | 9/1999 | |
| 2008/0282307 A1 | 11/2008 | McDonald et al. | WO | WO 99/49717 | 10/1999 | |
| 2008/0282308 A1 | 11/2008 | McDonald et al. | WO | WO 99/52285 | 10/1999 | |
| 2009/0141794 A1 | 6/2009 | Rodriguez et al. | WO | WO 99/57903 | 11/1999 | |
| 2009/0150958 A1 | 6/2009 | Jerding et al. | WO | WO 99/59903 | 11/1999 | |
| 2009/0158306 A1 | 6/2009 | Rodriguez et al. | WO | WO 99/60790 | 11/1999 | |
| 2009/0158324 A1 | 6/2009 | Rodriguez et al. | WO | WO 99/66719 | 12/1999 | |
| 2009/0158329 A1 | 6/2009 | Rodriguez et al. | WO | WO 00/02385 | 1/2000 | |
| 2009/0158331 A1 | 6/2009 | Rodriguez et al. | WO | WO 00/04726 | 1/2000 | |
| 2009/0158332 A1 | 6/2009 | Rodriguez et al. | WO | WO 00/05889 | 2/2000 | |
| 2009/0158335 A1 | 6/2009 | Rodriguez et al. | WO | WO 00/30354 | 5/2000 | |
| 2009/0158339 A1 | 6/2009 | Rodriguez et al. | WO | WO 00/40017 | 7/2000 | |
| 2009/0158352 A1 | 6/2009 | Rodriguez et al. | WO | WO 00/46988 | 8/2000 | |
| 2009/0158354 A1 | 6/2009 | Rodriguez et al. | WO | WO 00/49801 | 8/2000 | |
| 2009/0158355 A1 | 6/2009 | Rodriguez et al. | WO | WO 00/59202 | 10/2000 | |
| 2009/0158363 A1 | 6/2009 | Rodriguez et al. | WO | WO 00/60482 | 10/2000 | |
| 2009/0183081 A1 | 7/2009 | Rodriguez et al. | WO | WO 00/78031 A2 | 12/2000 | |
| 2009/0190028 A1 | 7/2009 | Rodriguez et al. | WO | WO 00/78045 A1 | 12/2000 | |
| 2009/0193468 A1 | 7/2009 | Rodriguez | WO | WO 00/78047 A1 | 12/2000 | |
| 2009/0193471 A1 | 7/2009 | Rodriguez | WO | WO 00/78048 A1 | 12/2000 | |
| 2009/0276808 A1 | 11/2009 | Jerding et al. | WO | WO 01/06788 A1 | 1/2001 | |
| 2009/0282372 A1 | 11/2009 | Jerding et al. | WO | WO 01/20907 A1 | 3/2001 | |
| 2009/0282440 A1 | 11/2009 | Rodriguez | WO | WO 01/24067 A1 | 4/2001 | |
| 2010/0242063 A1 | 9/2010 | Slaney et al. | WO | WO 01/56273 A1 | 8/2001 | |
| | | | WO | WO 01/67736 A1 | 9/2001 | |

FOREIGN PATENT DOCUMENTS

| | | | | | |
|---|---|---|---|---|---|
| CA | 2 223 025 C | 11/2001 | WO | WO 01/72042 A1 | 9/2001 |
| CA | 2 475 723 C | 1/2011 | WO | WO 01/76245 A2 | 10/2001 |
| EP | 0 572 090 A2 | 12/1993 | WO | WO 01/77888 A2 | 10/2001 |
| EP | 0 673 159 A1 | 9/1995 | WO | WO 01/84831 A2 | 11/2001 |
| EP | 0 680 214 A2 | 11/1995 | WO | WO 02/097584 A2 | 12/2002 |
| EP | 0 725 538 A2 | 8/1996 | WO | WO 03/003164 A2 | 1/2003 |
| EP | 0 763 936 A2 | 3/1997 | WO | WO 03/003709 A2 | 1/2003 |
| EP | 0 811 939 A2 | 12/1997 | WO | WO 03/014873 A2 | 2/2003 |
| EP | 0838915 | 4/1998 | WO | WO 03/024084 A2 | 3/2003 |
| EP | 0 849 948 A2 | 6/1998 | WO | WO 03/042787 A2 | 5/2003 |
| EP | 0 854 645 A2 | 7/1998 | WO | WO 03/069898 A1 | 8/2003 |
| EP | 0 891 084 A2 | 1/1999 | WO | WO 2004/091219 A1 | 10/2004 |
| EP | 0 896 318 A2 | 2/1999 | WO | WO 2004/100500 A2 | 11/2004 |
| EP | 0 909 095 A1 | 4/1999 | | | |

| | | |
|---|---|---|
| WO | WO 2005/059202 A1 | 6/2005 |
| WO | WO 2005/071658 A1 | 8/2005 |
| WO | WO 2007/030370 A1 | 3/2007 |

OTHER PUBLICATIONS

U.S. Appl. No. 09/590,904 filed Jun. 9, 2000 entitled "Program Information Searching System for Interactive Program Guide".
U.S. Appl. No. 09/693,790 filed Oct. 20, 2000 entitled "Integrated Searching System for Interactive Media Guide".
U.S. Appl. No. 09/692,995 filed Oct. 20, 2000 entitled "Media-on-Demand Bookmark System".
U.S. Appl. No. 09/692,920 filed Oct. 20, 2000 entitled "Media-on-Demand Title Indexing System".
U.S. Appl. No. 09/590,488 filed Jun. 9, 2000 entitled "User Interface Navigational System with Parental Control for Video on Demand System".
U.S. Appl. No. 09/518,041 filed Mar. 2, 2000 entitled "Apparatus and Method for Providing a Plurality of Interactive Program Guide Initial Arrangements".
Canadian Office Action dated Jan. 20, 2006 cited in Appln No. 2405491.
Canadian Office Action dated Jun. 20, 2007 cited in Appln No. 2405491.
Canadian Office Action dated May 22, 2008 cited in Appln No. 2405491.
Canadian Office Action dated Apr. 3, 2009 cited in Appln No. 2405491.
European Office Action dated Nov. 27, 2008 cited in Appln No. 01923092.9-2223.
PCT Written Opinion Appl. No. PCT/US01/10874 dated Jun. 4, 2002.
European Office Action dated Jul. 22, 2009 cited in Appln No. 01 923 092.9.
Canadian Office Action cited in Application No. 2,621,605 mailed Dec. 15, 2009.
U.S. Final Office Action cited in U.S. Appl. No. 11/564,431 mailed Jan. 4, 2010.
"A Brief History of the Trailer," http://www.movietrailertrash.com/views/history.html, 11 pages. (Publicly known at least as early as Dec. 20, 2003).
"Client User Interface Specification (Phase I) for Video-On-Demand Application Development on the Explorer 2000™ Digital Home Communications Terminal", Revision 1.10 (Aug. 31, 1998).
"Evidence of illustrative movie release years," Retrieved from the Internet Movie Database using Internet, http://www.imdb.com, 19 pages (Retrieved on Jun. 6, 2005).
"ISO/IEC 13818-6 Information technology - Generic coding of moving pictures and associated audio information - Part 6: Extensions for DSM-CC," Chapter 4, 113 pages (Sep. 1, 1998).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997).
"Sez You . . . origin of word daemon," *Take Our Word for It*, Issue 146, p. 4, http://www.takeourword.com/TOW146/page4.html (retrieved on Apr. 4, 2006).
Addington, Timothy H., "System Architecture Specification for Video-On-Demand Application Development on the Explorer 2000™ Digital Home Communications Terminal", Revision 1.10r Review Copy (Mar. 4, 1999).
ATI Multimedia Center 7.9, User's Guide, ATI Technologies Inc., pp. i-vi and 1-96 (Copyright 2002).
Barth et al., "10 Fernsehen am PC", Suse GMBH, XP-002324319, pp. 143-149 (2001).
BPAI Decision for U.S. Appl. No. 09/692,995, mailed Aug. 20, 2008.
BPAI Decision for U.S. Appl. No. 09/693,288, mailed Nov. 28, 2007.
Canadian Office Action cited in Application No. 2,376,556 mailed Sep. 30, 2008.
Canadian Office Action cited in Application No. 2,376,556 mailed Nov. 23, 2007.
Canadian Office Action cited in Application No. 2,376,556 mailed Dec. 6, 2005.
Canadian Office Action cited in Application No. 2,402,088 mailed May 30, 2006.
Canadian Office Action cited in Application No. 2,408,289 mailed Aug. 27, 2008.
Canadian Office Action cited in Application No. 2,408,289 mailed May 30, 2006.
Canadian Office Action cited in Application No. 2,451,477 mailed Nov. 3, 2009.
Canadian Office Action cited in Application No. 2,456,318 mailed May 5, 2008.
Canadian Office Action cited in Application No. 2,456,318 mailed Mar. 27, 2007.
Canadian Office Action cited in Application No. 2,459,334 mailed Apr. 16, 2009.
Canadian Office Action cited in Application No. 2,466,667 mailed Apr. 15, 2009.
Canadian Office Action cited in Application No. 2,475,723 mailed Jul. 7, 2009.
Cunningham et al., "5 Das X Window System"., Suse GMBH, XP-002324320, pp. 129-180 (2001).
Decision on Appeal affirmed cited in U.S. Appl. No. 09/590,434 mailed May 28, 2008.
Definition of "flag", *Microsoft Press: Computer User's Dictionary*, 3 pages (1998).
Definition of "renting", Webster's II: New College Dictionary, 1995, Houghton Mifflin Company, p. 939.
European Examination Report cited in Application No. 00 938 251.6 mailed Nov. 2, 2007.
European Examination Report cited in Application No. 00 939 759.7 mailed May 10, 2007.
European Examination Report cited in Application No. 01 905 058.2 mailed Dec. 19, 2006.
European Examination Report cited in Application No. 01 922 261.1 mailed Jul. 18, 2008.
European Examination Report cited in Application No. 01 922 261.1 mailed Nov. 2, 2007.
European Examination Report cited in Application No. 01 922 261.1 mailed Jan. 24, 2007.
European Examination Report cited in Application No. 01 922 261.1 mailed May 26, 2006.
European Examination Report cited in Application No. 01 937 209.3 mailed Jun. 23, 2008.
European Examination Report cited in Application No. 02 737 593.0 mailed May 6, 2009.
European Examination Report cited in Application No. 02 750 416.6 mailed Aug. 4, 2008.
European Examination Report cited in Application No. 02 750 416.6 mailed Aug. 28, 2007.
European Examination Report cited in Application No. 02 761 572.3 mailed Apr. 20, 2009.
European Examination Report cited in Application No. 02 761 572.3 mailed Sep. 22, 2008.
European Examination Report cited in Application No. 02 761 572.3 mailed Jan. 22, 2008.
European Examination Report cited in Application No. 02 761 572.3 mailed Aug. 29, 2007.
European Examination Report cited in Application No. 06 802 683.0 mailed Jun. 26, 2008.
Examiner's Answer to Appeal Brief cited in U.S. Appl. No. 09/590,488 mailed Jan. 11, 2008.
Japanese Office Action cited in Application No. 2001-581527 mailed Sep. 8, 2009.
Kevin, "Change Screen Resolution in Windows (Tips, Tricks, Tweaks, and Setting)," http://www.tacktech.com/display.cfm?t-tid=207, pp. 1-3 (Oct. 26, 2002).
McFedries, "The Complete Idiot's Guide to Windows 95," Que, 2nd Edition, p. 49 (1997).
PCT Search Report cited in International Application No. PCT/US00/15952 mailed Jan. 16, 2001.

PCT Search Report cited in International Application No. PCT/US00/15963 mailed Sep. 1, 2000.
PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Supplementary European Search Report cited in European Application No. 02737593.0 mailed Mar. 3, 2009.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.
U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Actino cited in U.S. Appl. No. 09/590,904 mailed Jul. 13, 2005.

U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in Serial No. 09/591,356 mailed Dec. 20, 2005.
U.S. Final Office Action cited in Serial No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.
U.S. Non-Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.

U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Non-Final Office Action cited in U.S. Appl. No. 11/162,345 mailed Aug. 21, 2009.
U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Non-Final Office Action cited in U.S. Appl. No. 11/564,431 mailed Aug. 24, 2009.
U.S. Non-Final Office Action cited in U.S. Appl. No. 11/678,653 mailed Dec. 16, 2009.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Non-Final Office Action cited in U.S. Appl. No. 12/372,917 mailed Oct. 26, 2009.
U.S. Non-Final Office Action cited in U.S. Appl. No. 12/388,139 mailed Dec. 15, 2009.
U.S. Non-Final Office Action cited in U.S. Appl. No. 12/389,564 mailed Nov. 10, 2009.
U.S. Non-Final Office Action cited in U.S. Appl. No. 12/413,686 mailed Nov. 30, 2009.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/590,434 filed Jun. 9, 2000 entitled "Video Promotional and Advertising Systems for Video on Demand System".

U.S. Appl. No. 09/590,521 filed Jun. 9, 2000 entitled "Systems and Methods for Adaptive Scheduling and Dynamic Bandwidth Resource Allocation Management in a Digital Broadband Delivery System".
U.S. Appl. No. 09/591,356 filed Jun. 9, 2000 entitled "Future Program Options Menu System for Interactive Program Guide".
U.S. Appl. No. 09/693,115 filed Oct. 20, 2000 entitled "Media Services Window Configuration System".
U.S. Appl. No. 09/565,931 filed May 4, 2000 entitled "Navigation Paradigm for Access to Television Services".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
U.S. Final Office Action cited in U.S. Appl. No. 10/740,138 mailed Jan. 15, 2010.
U.S. Non-final Office Action cited in U.S. Appl. No. 10/761,777 mailed Jan. 21, 2010.
U.S. Final Office Action cited in U.S. Appl. No. 10/981,053 mailed Jan. 21, 2010.
U.S. Final Office Action cited in U.S. Appl. No. 11/170,348 mailed Feb. 1, 2010.
U.S. Non-Final Office Action cited in U.S. Appl. No. 11/244,621 mailed Feb. 5, 2010.
U.S. Non-Final Office Action cited in U.S. Appl. No. 11/496,303 mailed Mar. 2, 2010.
U.S. Non-Final Office Action cited in U.S. Appl. No. 12/179,767 mailed Jan. 22, 2010.
Japanese Office Action mailed Feb. 10, 2010 in Application No. 2001-581527.
European Examination Report cited in Application No. 00 938 251.6 mailed Mar. 2, 2010.
Supplementary European Search Report cited in European Application No. 02744705.1 mailed Feb. 19, 2010.
Alberico, G. et al., "Satellite Interactive Multimedia: A New Opportunity for Broadcasters," *International Broadcasting Convention*, Conference Publication No. 447, pp. 18-23 (Sep. 12-16, 1997).
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Rottentomatoes web archived site, http://web.archive.org/web/20000301122211/http://rottentomatoes.com, Mar. 1, 2000, pp. 1-2.
U.S. Final Office Action cited in U.S. Appl. No. 12/372,887 mailed Apr. 14, 2010.
European Examination Report cited in Application No. 01 937 209.3 mailed Mar. 16, 2010.
Canadian Office Action cited in Application No. 2,554,208 mailed Apr. 1, 2010.
U.S. Final Office Action cited in U.S. Appl. No. 11/162,345 mailed Mar. 16, 2010.
U.S. Final Office Action cited in U.S. Appl. No. 11/460,516 mailed Mar. 18, 2010.
U.S. Non-Final Office Action cited in U.S. Appl. No. 12/127,968 mailed Mar. 31, 2010.
U.S. Final Office Action cited in U.S. Appl. No. 10/957,854 mailed Apr. 1, 2010.
U.S. Non-Final Office Action cited in U.S. Appl. No. 10/934,253 mailed Apr. 27, 2010.
U.S. Non-Final Office Action cited in U.S. Appl. No. 11/275,245 mailed May 5, 2010.
U.S. Final Office Action cited in U.S. Appl. No. 12/372,917 mailed May 17, 2010.
U.S. Final Office Action cited in U.S. Appl. No. 12/389,564 mailed Apr. 28, 2010.
U.S. Final Office Action cited in U.S. Appl. No. 09/896,231mailed May 28, 2010.
Canadian Office Action cited in Application No. 2,402,088 mailed Jun. 1, 2010.
Canadian Office Action cited in Application No. 2,405,491 mailed Jun. 9, 2010.
Summons to attend oral proceedings pursuant to Rule 115(1) EPC in European Application No. 02737593.0-1241 mailed May 28, 2010.
U.S. Non-Final Office Action cited in U.S. Appl. No. 09/693,288 mailed Jun. 21, 2010.
U.S. Non-Final Office Action cited in U.S. Appl. No. 11/963,942 mailed Jun. 8, 2010.
U.S. Non-Final Office Action cited in U.S. Appl. No. 12/389,128 mailed Jun. 2, 2010.
U.S. Final Office Action cited in U.S. Appl. No. 12/413,686 mailed Jun. 10, 2010.
U.S. Non-Final Office Action cited in U.S. Appl. No. 10/957,942 mailed Jun. 30, 2010.
U.S. Final Office Action cited in U.S. Appl. No. 11/678,653 mailed Jun. 23, 2010.
U.S. Non-Final Office Action cited in U.S. Appl. No. 12/180,416 mailed Jun. 25, 2010.
U.S. Final Office Action cited in U.S. Appl. No. 12/388,139 mailed Jul. 6, 2010.
U.S. Final Office Action cited in U.S. Appl. No. 11/496,303 mailed Jul. 22, 2010.
U.S. Non-Final Office Action cited in U.S. Appl. No. 11/564,431 mailed Jul. 20, 2010.
U.S. Non-Final Office Action cited in U.S. Appl. No. 11/963,945 mailed Jul. 16, 2010.
U.S. Final Office Action cited in U.S. Appl. No. 10/761,777 mailed Aug. 2, 2010.
U.S. Non-Final Office Action cited in U.S. Appl. No. 11/963,951 mailed Aug. 2, 2010.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Final Office Action cited in U.S. Appl. No. 11/244,621 mailed Aug. 18, 2010.
U.S. Final Office Action cited in U.S. Appl. No. 12/179,767 mailed Aug. 20, 2010.
U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,408,289 mailed Sep. 2, 2010.
Canadian Office Action cited in Application No. 2,451,477 mailed Oct. 20, 2010.
U.S. Final Office Action cited in U.S. Appl. No. 12/127,968 mailed Sep. 14, 2010.
U.S. Non-Final Office Action cited in U.S. Appl. No. 12/390,418 mailed Sep. 28, 2010.
U.S. Non-Final Office Action cited in U.S. Appl. No. 12/390,420 mailed Oct. 19, 2010.
U.S. Non-Final Office Action cited in U.S. Appl. No. 12/390,422 mailed Oct. 20, 2010.
U.S. Non-Final Office Action cited in U.S. Appl. No. 11/170,348 mailed Oct. 26, 2010.
U.S. Non-Final Office Action cited in U.S. Appl. No. 10/740,138 mailed Oct. 27, 2010, 23 pages.
U.S. Non-Final Office Action cited in U.S. Appl. No. 10/934,253 mailed Nov. 4, 2010, 10 pages.
U.S. Final Office Action cited in U.S. Appl. No. 12/389,128 mailed Nov. 9, 2010, 50 pages.
Canadian Office Action cited in Application No. 2,456,318 maled Nov. 17, 2010, 4 pages.
"Industry Leading Software Vendors Endorse BroadVision's Next Generation of Retail and Business-To-Business E-Commerce Application Solutions," PR Newswire, Jun. 14, 1999, 4 pages.
U.S. Final Office Action cited in U.S. Appl. No. 09/693,288 mailed Feb. 8, 2011, 28 pages.

U.S. Non-Final Office Action cited in U.S. Appl. No. 11/162,345 mailed Feb. 1, 2011, 33 pages.
U.S. Non-Final Office Action cited in U.S. Appl. No. 12/179,763 mailed Jan. 4, 2011, 18 pages.
U.S. Non-Final Office Action cited in U.S. Appl. No. 12/389,564 mailed Jan. 21, 2011, 13 pages.
U.S. Non-Final Office Action cited in U.S. Appl. No. 12/413,686 mailed Mar. 17, 2011, 20 pages.
U.S. Non-Final Office Action cited in U.S. Appl. No. 10/934,253 mailed Apr. 29, 2011, 11 pages.
Canadian Office Action cited in Application No. 2,459,334 mailed Mar. 4, 2011, 3 pages.
Summons to attend oral proceedings in EP Application No. 01937209.3 mailed Mar. 21, 2011, 7 pages.
U.S. Non-Final Office Action cited in U.S. Appl. No. 10/761,777 mailed Apr. 12, 2011, 20 pages.

\* cited by examiner

SYSTEM FOR PROVIDING ALTERNATIVE SERVICES

FIELD OF THE INVENTION

This invention relates in general to the field of television systems, and more particularly, to the field of providing services in television systems.

BACKGROUND OF THE INVENTION

Historically, television services have been comprised of analog broadcast audio and video signals. Cable television systems now receive broadcasts and retransmit them with other programming to subscribers over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the settop box, has become an important computing device for accessing video services and navigating a subscriber through a maze of services available. In addition to supporting traditional analog broadcast video functionality, digital HCTs (or "DHCTs") now also support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advanced navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those which have traditionally been provided.

Each HCT or DHCT (collectively hereinafter "DHCT") is typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

Because many separate services may be offered by a single cable television service provider to each individual subscriber, including television viewing channels as well as other applications, there is a need for the DHCT to not only be able to provide each service that the cable television system provider offers but also be able to flexibly control access to services that are denoted as premium services. In addition, certain television programs can now be broadcast in advanced formats, such as in high definition television (HDTV) format; however, there is currently no mechanism for efficiently handling such advanced formats to effectively integrate them into systems which must also continue supporting older formats.

SUMMARY OF THE INVENTION

Briefly described, the preferred embodiment of the present invention provides a system for providing alternative services in a television system. In one implementation, a subscriber is provided an alternative service upon attempting to access an unauthorized service, thereby providing a framework for efficient control of conditional access and enhanced services. In addition, in one implementation, user device limitations or variations are handled conveniently through the same multi-purpose system for providing alternative services.

According to one implementation, a client device receives from a server device and stores in client device memory a service database and an authorization database. The service database comprises references to a plurality of services and reference to a plurality of corresponding channels, and said authorization database comprises a list of authorizations individual to said subscriber or DHCT and corresponding to said plurality of services. The client device accesses the service database when the subscriber attempts to access a desired channel to determine a first service corresponding to the desired channel. After learning which service corresponds to the desired channel, the client device then determines whether the subscriber is authorized for that first service according to the authorization database and presents the first service to the subscriber on a display device if the authorization database reveals that the subscriber is authorized for the first service. However, the client device will present an alternative service according to the service database if the subscriber is unauthorized to receive the first service.

In another implementation of the present invention, the client device provides a subscriber an alternative service upon a subscriber's attempt to access a service misconfigured or unsuited for the subscriber's equipment, such as a display device coupled to said client device, or the client device itself. In this embodiment, in addition to mapping alternative services to certain services in the service database, the service database includes information for each service regarding a required viewing configuration, such as a high definition television format. In much the same way as above, the client device automatically provides the appropriate formatted version of services.

Other objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
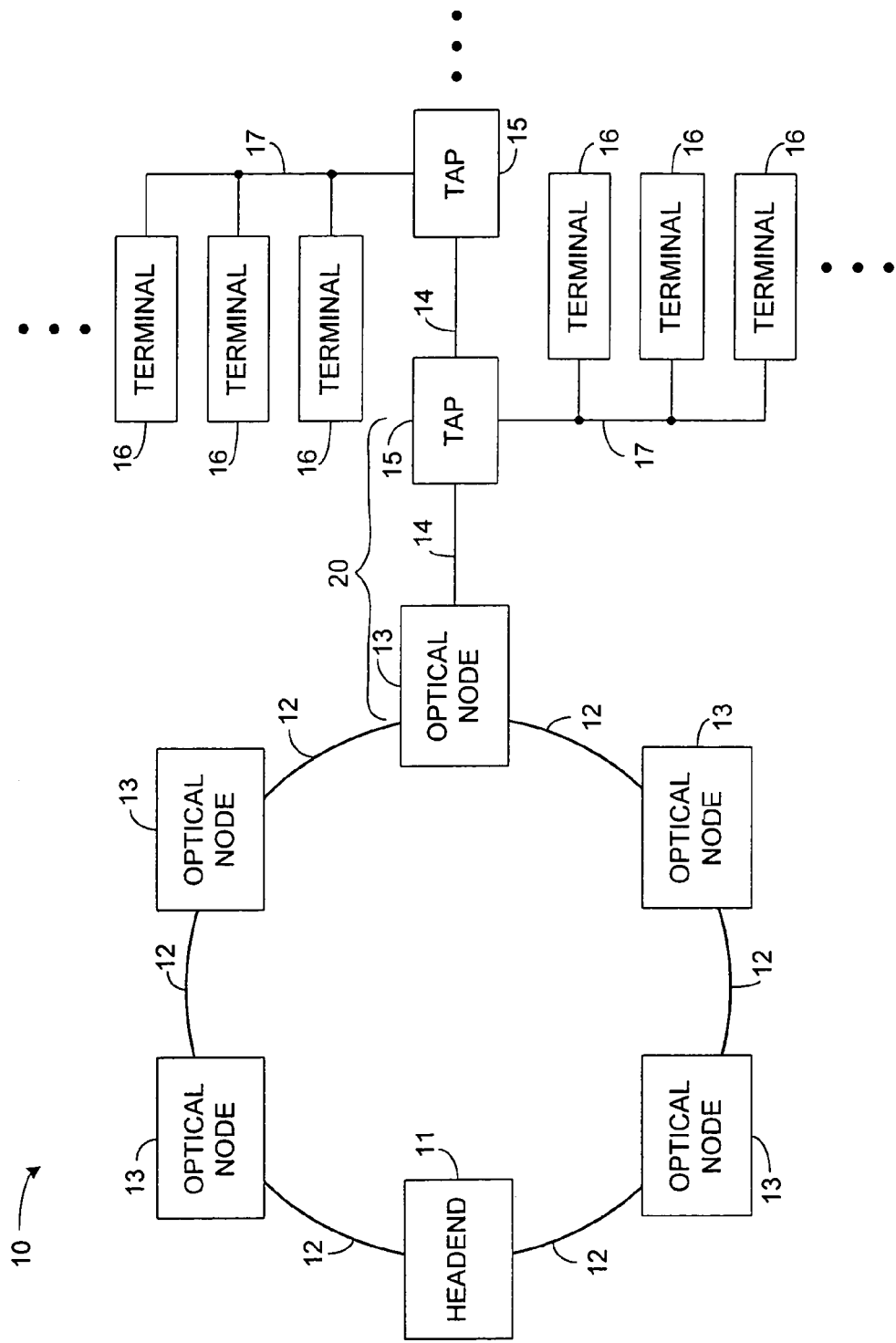
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
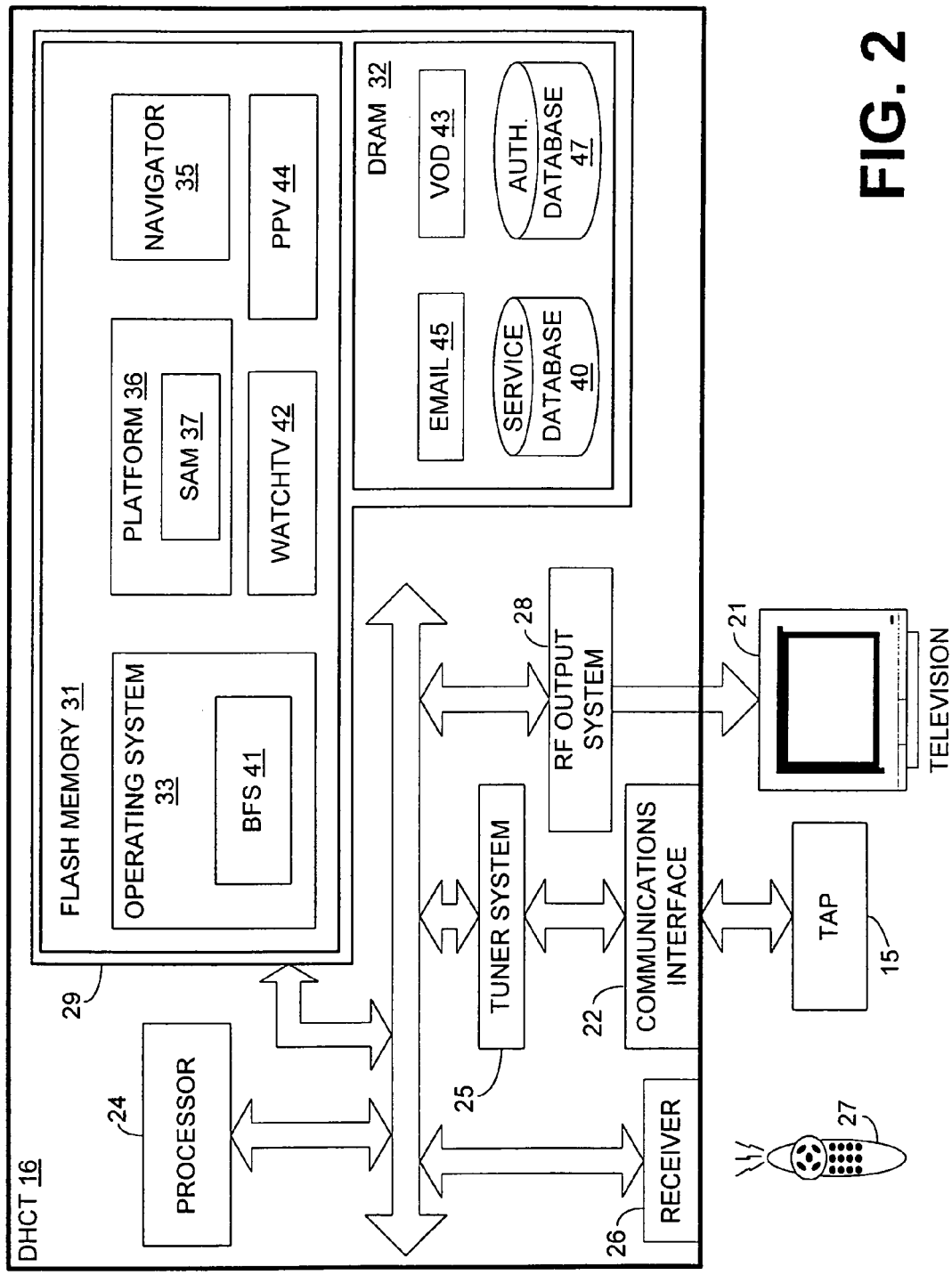
FIG. 2 is a block diagram of a DHCT with components and applications shown in various memories with related equipment in accordance with the preferred embodiment of present invention depicted in FIG. 1.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included with a computer or a television, and that processes media transported in television signals for presentation or playback to a subscriber (user of the DHCT). The DHCT 16 preferably comprises a communications interface 22 for receiving the RF signals, which can include media such as video, audio, graphical and data information, from the tap 15 and for providing any reverse information to the tap 15 for transmission back to the headend 11 (FIG. 1). The DHCT 16 further includes a processor 24 for controlling operations of the DHCT 16, including a video output port such as an RF output system 28 for driving the display 21, a tuner system 25 for tuning into a particular television channel to be displayed and for sending and receiving data corresponding to various types of media from the headend 11. The tuner system 25 includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as subscriber inputs or commands for other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The subscriber inputs may, for example, be provided by a computer or transmitter with buttons or keys located either on the exterior of the terminal or by a hand-held remote control device 27 or keyboard that includes subscriber-actuated buttons.

In one implementation, a memory portion 29 of the DHCT 16 includes flash memory 31 and dynamic random access memory (DRAM) 32 for storing the executable programs and related data components of various applications and modules for execution by the DHCT 16. Both the flash memory 31 and the DRAM memory 32 are coupled to the processor 24 for storing configuration data and operational parameters, such as commands that are recognized by the processor 24.

Basic functionality of the DHCT 16 is provided by an operating system 33 that is contained in flash memory 31. One or more programmed software applications, herein referred to as applications, are executed by utilizing the computing resources in the DHCT 16. The application executable program stored in FLASH memory 31 or DRAM memory 32 is executed by processor 24 (e.g., a central processing unit or digital signal processor) under the auspices of the operating system 33. Data required as input by the application program is stored in DRAM memory 32 and read by processor 24 from DRAM memory 32 as need be during the course of application program execution. Input data may be data stored in DRAM memory 32 by a secondary application or other source, either internal or external to the DHCT 16, or possibly anticipated by the application and thus created with the application program at the time it was generated as a software application program, in which case it is stored in FLASH memory 31. Data may be received via any of the communication ports of the DHCT 16, from the headend 11 via the DHCT's network interface (i.e., the QAM or out-of-band tuners) or as subscriber input via receiver 26. A type of input data fulfills and serves the purpose of parameters as described below. Data generated by an application program is stored in DRAM memory 32 by processor 24 during the course of application program execution.

Availability, location and amount of data generated by a first application for consumption by a secondary application is communicated by messages. Messages are communicated through the services of the operating system, such as interrupt or polling mechanisms or data sharing mechanisms such as semaphores.

The operating system 33 operates a broadcast file system (BFS) client module 41. The BFS client 41 is in constant communication with a similar module on the server side (BFS server 55 in FIG. 3) in the headend 11. This BFS system 41, 55 provides a mechanism for delivering various types of media or data from a group of servers to a client such as the DHCT 16 attached to the network 10. This data can contain practically any type of information. Applications on both the server and the client can access the data via the BFS in a similar manner to a file system found on disk operating systems. The DHCT 16 does not typically have enough memory resources to store all the data that is capable of being broadcast from the BFS server 55. Even if the DHCT 16 could store all the data, there is no guarantee that the DHCT 16 would receive an error-free copy of the data in a single transmission. In some implementations of a broadcast environment, the DHCT 16 does not request that a server re-send any data that was missed and received in error. Also, since the data is being sent to many similar DHCTs 16, it is prohibitive in some implementations to require that the server re-send missed data to each DHCT 16 that requests it. To ensure that all DHCTs 16 are able to receive an error-free copy of the data, a BFS server 55 (shown in FIG. 3) repeatedly sends the data over a period of time in a cyclical fashion so that the DHCT 16 that is interested in the data may receive it only when it is required. Thus, the BFS client 41 is the module in the DHCT 16 that receives the broadcast from the BFS server 55. Consequently, in some implementations, if the DHCT data has an error, as detected by error detection circuitry or mechanisms in DHCT 16, the BFS client 41 waits for the next broadcast of the data to receive any data that it may need.

The BFS 41, 55 is implemented to appear to applications as a standard hierarchical file system that is common in computer operating systems. The underlying mechanism for transporting files from a headend server 111 to a DHCT 16 relies on a broadcast data carousel mechanism (not shown) that in a preferred embodiment is compliant with the carousel channel specification of the ISO MPEG-2 (Motion Picture Experts Group-Second Standard) entitled Digital Storage Media-Command and Control (DSM-CC). Uniform resource locators (URL) specify "bfs:" as the protocol identity files on the carousel.

Also contained in flash memory 31 is a navigator application 35, which provides a navigation framework for the subscriber to access services available on the cable system. Examples of the services include, in one implementation, watching television and pay-per-view events, listening to digital music, and an interactive program guide, each of which is controlled through separate applications in flash memory 31. The navigator 35 also allows users to access various settings of the DHCT 16, including volume, parental control, VCR commands, etc.

Watch TV 42 and Pay-Per-View (PPV) 44 are resident applications in flash memory 31. Watch TV 42 enables a user to simply "watch television" while PPV 44 enables viewing of premium television services. These applications, because they are in flash memory 31, are always available to the subscriber and do not need to be downloaded each time the DHCT 16 initializes.

The flash memory 31 also contains a platform library 36. The platform library 36 is a collection of functionality useful to applications, such as a Timer Manager, Compression Manager, a HTML Parser, Database Manager, Widget Toolkit, String Managers, and other utilities (not shown). These utilities are accessed by applications as necessary so that each application does not have to contain these utilities thus resulting in memory consumption savings and a consistent user interface.

A Service Application Manager (SAM) provides a model in which the subscriber can access services available on the system. A service consists of an application to run and a parameter, such as data content, specific to that service. The SAM handles the lifecycle of the applications on the system, including the definition, initiation, activation, suspension and deletion of services they provide and the downloading of the application into the DHCT 16 as necessary. Many services can be defined using the same application component, with different parameters. The SAM includes a SAM server 56 (FIG. 3) in headend 11 and a SAM client 37 in the DHCT 16. The SAM client 37 (hereinafter referred to as SAM 37) is a part of the platform 36. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

In an alternate embodiment, the same parameter can be invoked by different applications. For instance, HBO can be viewed in a conventional manner or with an application that provides service enhancements for an additional purchase fee. Examples of aggregate functionality included as service enhancements include: the right to record and save the service to a storage device (a.k.a right to copy); the right to pause, stop, resume play, rewind and fast-forward on a real-time basis when DHCT 16 contains internally or externally a media recording device with storage capabilities (but without the right to keep a permanent copy in storage); and the right to receive the service in superior audio quality such as Dolby AC-3 rather than in stereo. Thus, the SAM 37 provides a subscriber alternative versions of the same service, each a service enhancement with aggregate functionality. When the subscriber initially activates a service, the SAM 37 attempts to first provide the most-enhanced service to the subscriber before providing a less-enhanced or basic service based on the subscriber's authorization status. A service enhancement is authorized to a subscriber upon the subscriber purchasing the service enhancement as a subscription or a one-time period (i.e., pay per view) for a purchase fee. If a subscription of the alternate enhanced service is purchased, then each time the authorized subscriber accesses the service, the service is rendered with the authorized aggregated functionality. If the most-enhanced service is not authorized to the subscriber, then the SAM 37 attempts to provide a less-enhanced service or a basic service. In much the same way as described herein, the client device automatically provides the appropriate version of the enhanced services based on the subscriber's authorization status.

Various application clients can be downloaded into DRAM 32 via the BFS or other means, such as TCP/IP, at the request of the SAM 37. An application client is the portion of an application that executes on the DHCT 16 and provides the application's services to the subscriber typically through a graphical user interface. The applications that are stored in the DRAM 32 may be applications that are loaded when the DHCT 16 initializes or are applications that are downloaded to the DHCT 16 upon a subscriber-initiated command using an input device such as the remote 27. In this non-limiting example, as shown in FIG. 2, DRAM 32 contains the following application clients (hereinafter referred to as "application(s)"): a video-on-demand application (VOD) 43, and an e-mail application 45. It should be obvious to one with ordinary skill in the art that these applications are not limiting and merely serve as examples for this present embodiment of the invention.

The applications shown in FIG. 2 and all others provided by the cable system operator are top level software entities on the network for providing services to the subscriber. In one implementation, all applications executing on the DHCT 16 work with the navigator 35 by abiding by several guidelines. First, an application must utilize and implement the SAM 37 for provisioning, activation, and suspension of services. Second, an application must share DHCT 16 resources with other applications and abide by the resource management policies of the SAM 37, the operating system 33, and the DHCT 16. Third, an application must handle all situations where resources are unavailable without navigator 35 intervention. Fourth, when an application loses service authorization while providing a service, an application should suspend the service. The navigator 35 will reactivate an individual service application when it later becomes authorized. Finally, an application must be configured so it does not have access to certain user subscriber input keys that are reserved by the navigator 35 (i.e., power, channel +/−, volume +/−, etc.). However, without any limitations to the aforementioned, in certain circumstances certain applications during the course of program execution may reach a machine-state in which input keys that would ordinarily be reserved may be employed for input by the application but only during that particular machine-state. For instance, an application may display a user interface that specifically requests input or selection from the subscriber in which one or more of the reserved keys are used momentarily during that machine-state.

Figure 3:
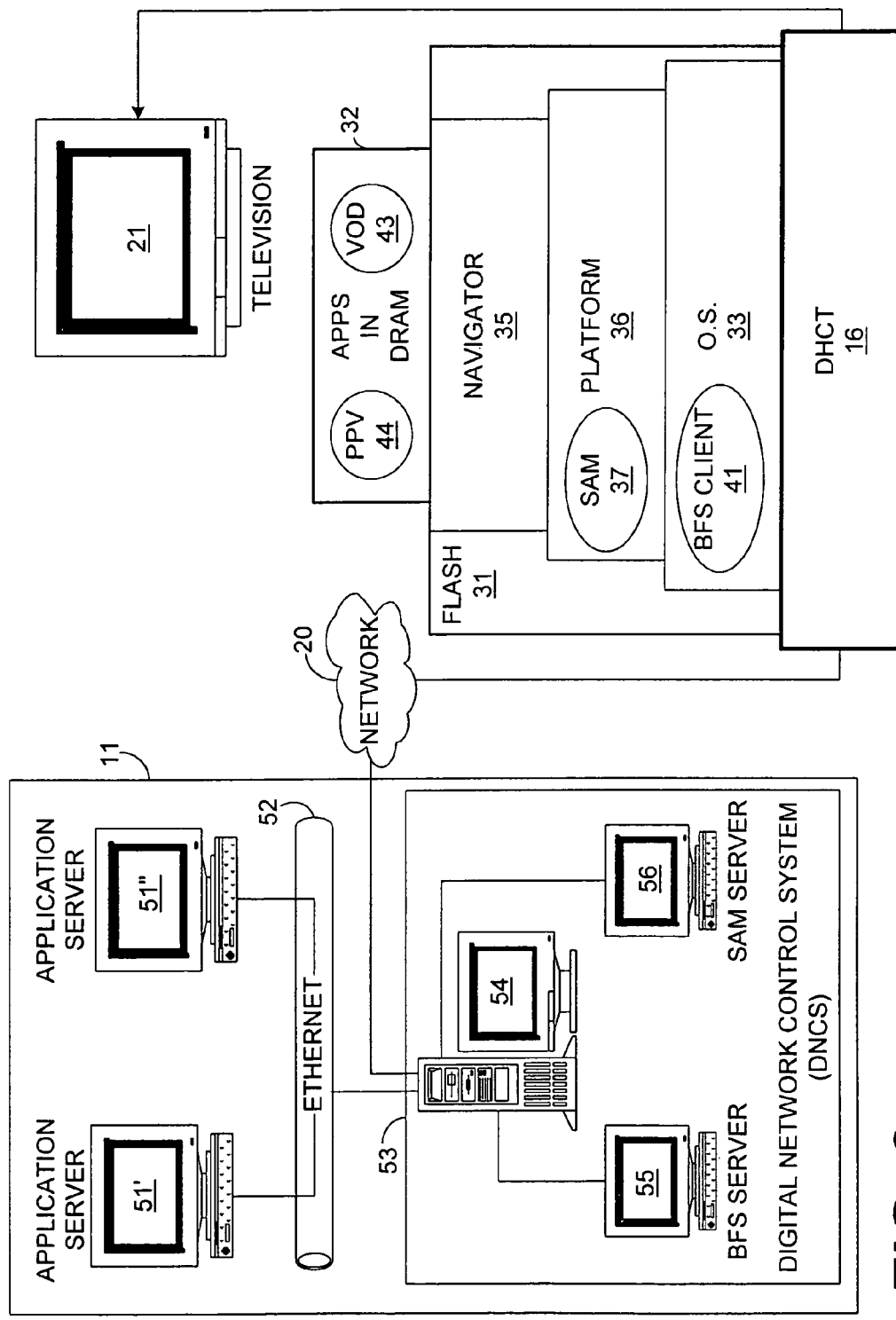
FIG. 3 is a diagram of selected components located in the headend and DHCT of the cable television system shown in FIG. 1.

FIG. 3 is a diagram of the cable television system of FIG. 1 including selected components located in the headend of the cable television system and a layered view of selected elements in the DHCT. In the implementation shown, the headend 11, includes multiple application servers 51, 51', 51" that are responsible for provisioning the services provided by the application and for providing the content or data needed by the DHCT 16, which is discussed in more detail below. A series of application servers 51 are connected to a digital network control system 53 via an Ethernet connection 52 such as a 10BaseT or a 100BaseT. An application server manager (not shown) may be included to serve as a registry for all application servers 51 residing on the system headend 11. Through the application server manager graphical user interface (GUI), the GUI for all application servers 51 can be accessed.

The digital network control system (DNCS) 53 provides complete management, monitoring, and control of the network's elements and broadcast services provided to subscribers. The DNCS 53 includes the definitions of sources, digital storage media command and control (DSM-CC) user-to-network configuration of DHCTs in the network 20 and conditional access management. The application server 51 communicates via the Ethernet 52, through an operational system 54, to the SAM server 56 contained on the DNCS 53. The application server 51 defines a particular application to the SAM server 56, and the SAM server 56 instructs the BFS server 55 to add the particular application's executable code and possibly one or more data components related to the service to the carousel (not shown) for distribution to the various DHCTs of the network 10. The SAM server 56 provides various features for each application that directs its execution in the network 20. In preparation to introduce the application, the SAM server 56 also provides a mapping from the display channel number presented to the subscriber to the service, and vice versa, including the capability to have one service on a channel for a specified time and another service on that channel for a different specified time. The SAM server 56 additionally provides an interface on the SAM server 56 to specify service-related data, and the SAM client 36 on the DHCT 16 provides an interface to access this information efficiently. The SAM server 56 contains information and configuration data whereby applications and services on the DHCT 16 can be activated and suspended remotely by the SAM server 56 by a signaling message.

Continuing with FIG. 3, the DHCT 16 receives the service information from the SAM server 56 when the DHCT 16 is initially powered-up or when an update message is initiated by the headend 11 denoting a change in existing services. Upon receiving the service information, the SAM 37 resident in the DHCT 16 interprets this information and stores it in SAM database 40 (shown in FIG. 2).

Figure 4:
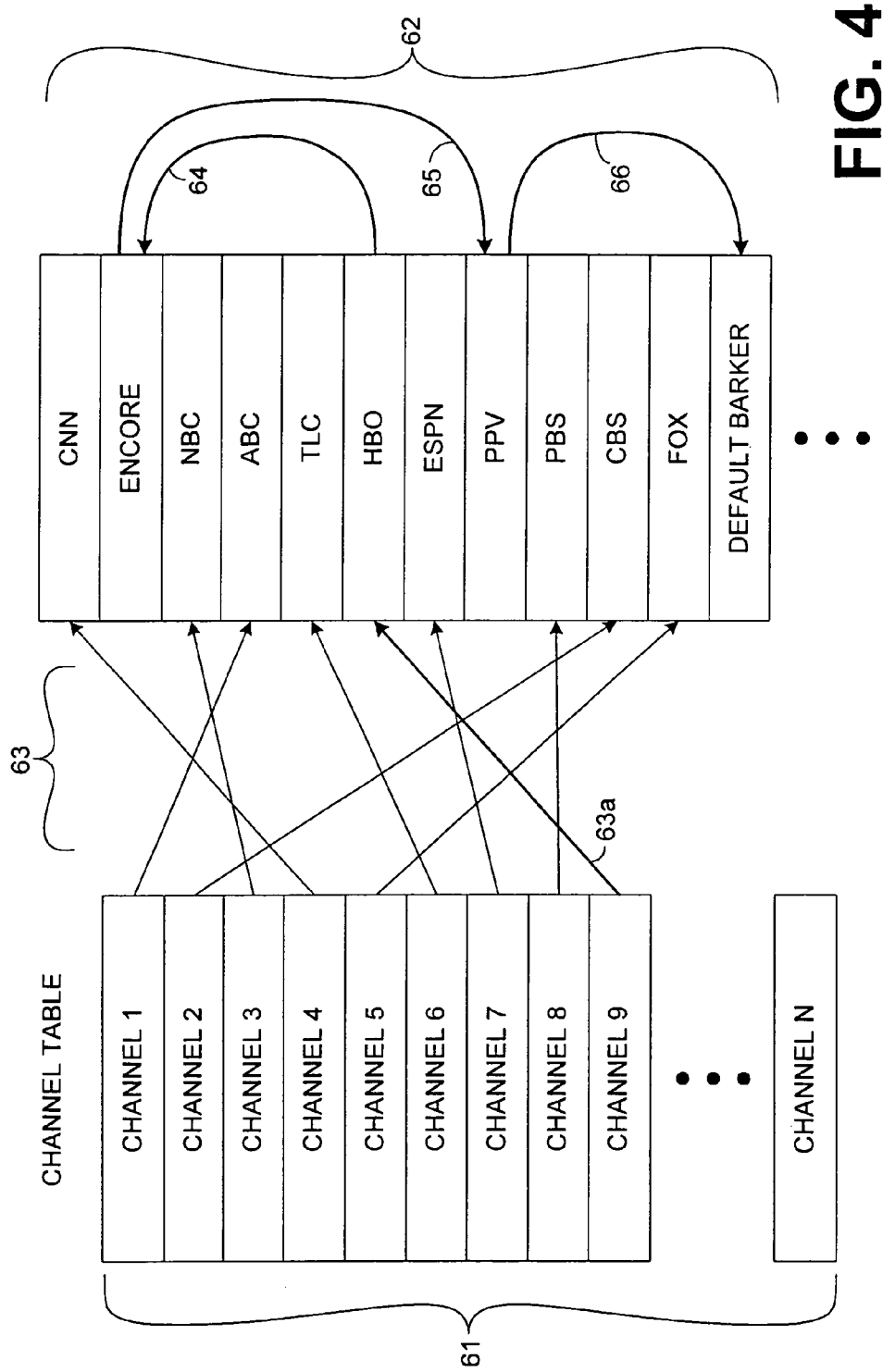
FIG. 4 is a diagram of one example of a service and channel mapping scheme stored in memory of the DHCT shown in FIG. 2.

FIG. 4 is a diagram of one example of a channel mapping scheme stored in memory of the DHCT 16 shown in FIG. 2. The service information is, in one implementation, a collective term including a channel table 61 and a service table 62. The channel table 61 is a mapping of each channel to which the subscriber may tune the DHCT 16 to the service provided on that channel. The service table 62 is a list of each individual service offered by the cable television system provider as configured by the SAM server 56. Thus, the system operator may configure the channel line-up by setting the various channels in channel table 61 to point 63 to the various services in the service table 62. In this non-limiting example, Channel 1 may be mapped by the SAM server 56 to the ABC service, Channel 2 may be mapped to the CBS service, Channel 3 may be mapped to the NBC service, and so on. Thus, when the subscriber initiates a command via the remote 27 to view channel 1, the navigator 35 accesses the SAM 37 to determine what service corresponds to channel 1. The SAM 37 accesses the SAM database 40 and determines that channel 1 corresponds to the ABC service and returns that information to the navigator 35. After authorization, as discussed below, the navigator 35 instructs the SAM 37 to activate the ABC service, provided by the watch TV application. Upon receiving that message, the watch TV application uses the operating system 33 to set the tuner system 25 to tune the ABC source specified as the parameter in the ABC service, for rendering the service to the subscriber, in this case the presentation of video and audio on the display 21.

A subscriber is generally able to navigate on any individual channel of all the channels available by the DHCT 16 for viewing the corresponding service mapped to that channel as denoted by the channel mapping table contained in the SAM database 40. However, it is also generally understood that a subscriber may or may not subscribe to each individual service provided or offered by the cable television systems operator. The DHCT 16 contains in DRAM 32 an authorization database 47 containing the authorizations of all services for the subscriber utilizing that specific DHCT 16. The authorization database 47 is periodically updated by the headend 11 to denote any changes in the subscriber's available services.

Authorization information can be specified using the SAM server 56 for each service in the service table. This information can include a conditional access "key" specific to the system that can be delivered to specific DHCTs 16 in a secure manner and processed by a security processor (not shown) and/or conditional access components (not shown) housed in DHCT 16. It also can include an alternate service to use if the given service is not authorized. As an example, the service table 62 contains pointers 64, 65, 66 routing a service to a different service other than the first service so that the second or subsequent service is an alternative to the first service which may be prohibited to an individual subscriber.

Figure 5:
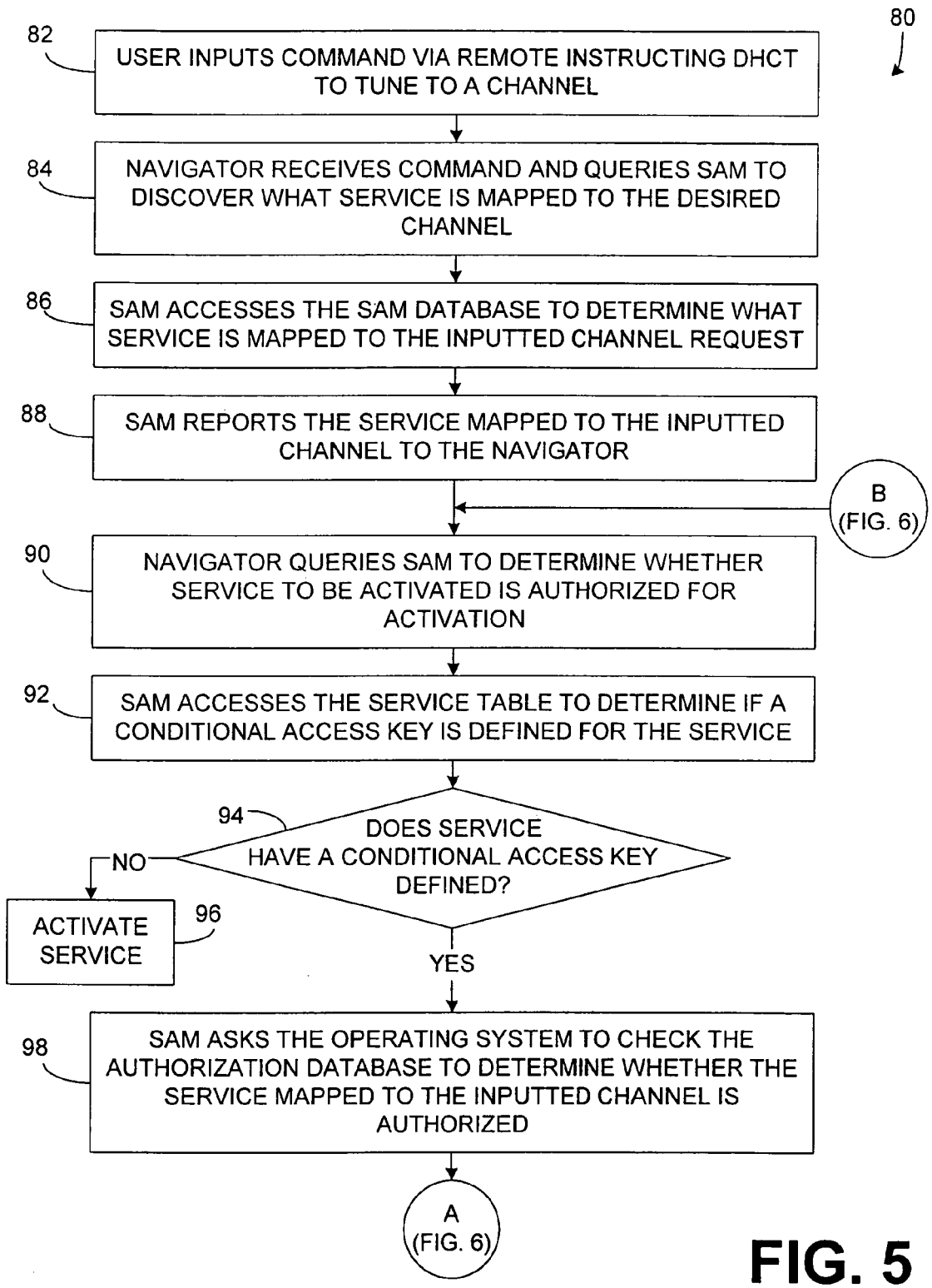
FIGS. 5 and 6 comprise a flowchart representation of the alternative service scheme implemented by the DHCT shown in FIG. 2.
Figure 6:
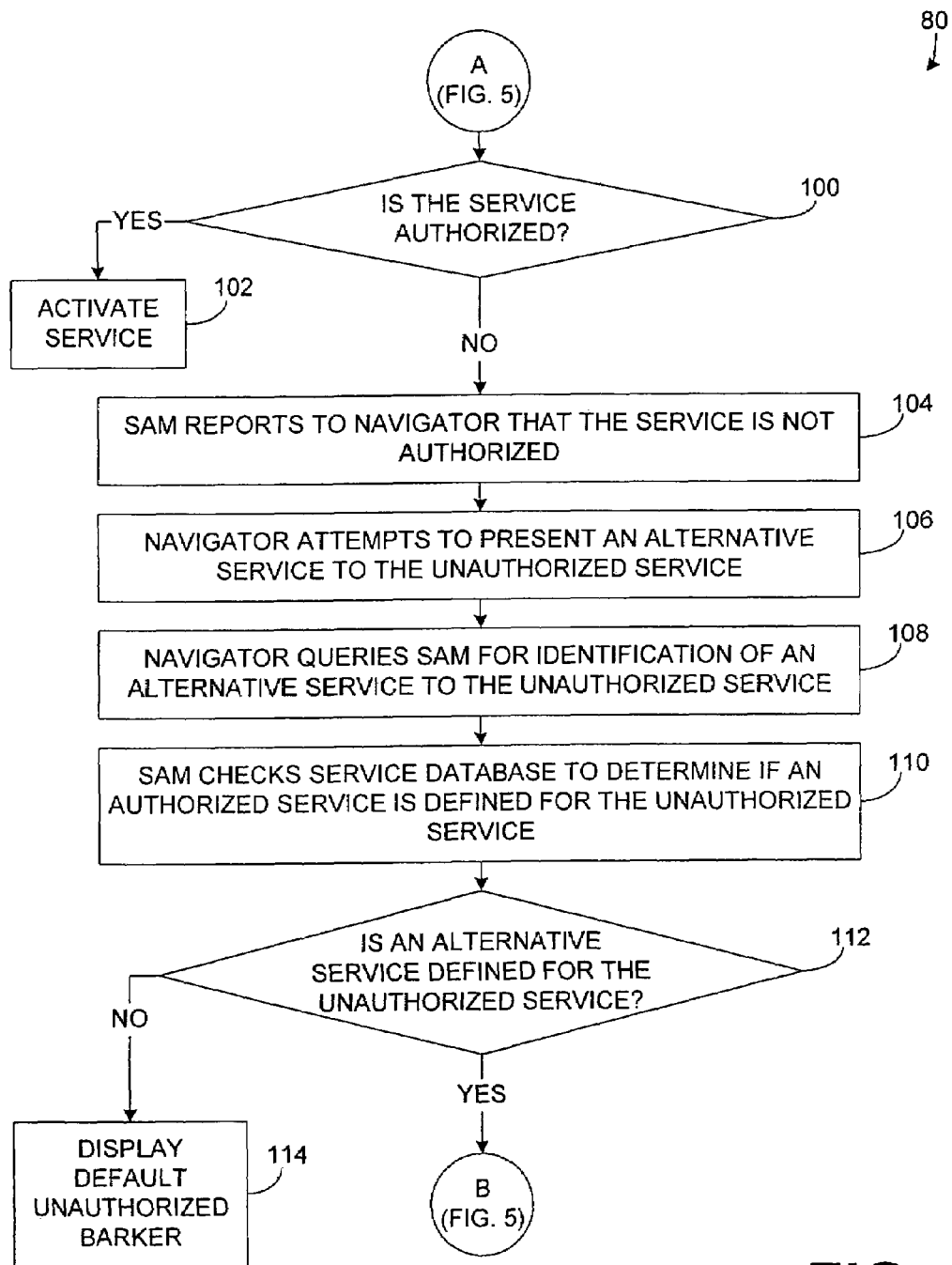

With additional reference to FIGS. 5 and 6, the SAM 37 and the navigator 35, in this non-limiting example, implement the service activation using an alternative service scheme 80 in the following manner. If a subscriber attempts to tune the DHCT 16 to channel 9, as in step 82, the subscriber inputs that command to the DHCT 16 via the remote 27. The navigator 35 will eventually receive the input command from the remote and query the SAM 37 to learn what service is linked to channel 9 as requested by the subscriber, as in step 84. The SAM 37 accesses the SAM database 40 to read the channel table 61 to determine which service is referenced to channel 9 in channel table 61, as in step 86. In this example, the SAM 37 reports to the navigator 35, as depicted in step 88, that the service Watch TV+HBO is mapped through pointer 63a to channel 9 in the channel table 61. The navigator 35 next requests of SAM 37, as in step 90, whether the Watch TV+HBO service is authorized to the individual subscriber making the request. The SAM 37, in step 92, accesses the service table 62 to determine, in step 94, if a conditional access or authorization "key" is defined for HBO. If no key is defined for HBO, SAM 37 activates the service, as in step 96. If an authorization key is defined for HBO, SAM 37 uses that "key," as in step 98, to ask the operating system 33 to check the authorization database 47 to determine whether the Watch TV+HBO service is authorized to the subscriber, as depicted in step 100. If, in this non-limiting example, the subscriber is authorized to view Watch TV+HBO, SAM 37 reports this fact to the navigator 35 and the service is activated, as shown in step 102. However, if the subscriber is not authorized for the service (Watch TV+HBO), SAM 37 reports this facts to the navigator as well, as in step 104.

The navigator 35 may then present the subscriber with several options that range from either a denial of service, an opportunity to purchase the service, or a routing to an alternative service (which may include a service offering purchase of the first service). Traditionally, the simplest solution is to merely present an unauthorized message screen to the user on channel 9 denoting that the subscriber has not paid or purchased that particular service. The navigator 35 may also be configured to present the subscriber an opportunity to purchase the prohibited service, in this case, HBO, either as a subscription or a one-time fee similar to pay per view by inputting commands through the remote 27 to acknowledge the purchase of the HBO service. Such an opportunity may be provided through a "purchase HBO" service available as an alternative service, as discussed below. In providing the subscriber the opportunity to purchase the prohibited service, the navigator 35 may present descriptive information about the individual service features and functions as a marketing attempt to entice the subscriber to purchase the prohibited service.

As stated above, a service, in an alternate embodiment, may also be provided in one of a multiplicity of alternate service modes, each mode corresponding to an alternate service with aggregate functionality. A subscriber that purchases an enhanced version of the service is authorized to receive the respective enhanced version of the service. A service provided in a multiplicity of alternate service modes can be rendered through SAM 37 with different respective applications for each enhanced version of the service or combinations of different multiple versions of enhancements. Alternatively, a single application can render one or more, or possibly all enhanced versions of the service by querying the subscriber's authorizations as previously described.

Navigator 35 may also automatically use the SAM 37 to activate and present the subscriber an alternative service, as in step 106, for the subscriber to view which may either be a service already in the subscriber's viewing plan or an alternative service that is more economical or currently available as opposed to the prohibited service. Alternatively, an enhanced version of the service may be presented to the subscriber for purchase as either for a subscription fee or a one-time period fee similar to pay per view. Continuing the non-limiting example, when the navigator 35 determines that the Watch TV+HBO service is not authorized, it queries the SAM 37 to determine if there is an alternate service, as in step 108. The SAM 37, in step 110, checks its database 40 and determines that the alternative service is the Encore service, as in step 112. In this case the navigator 35 repeats the authorization query with the SAM 37 for the Encore service, and if it is authorized presents the service by activating it using the SAM 37, as in step 102. The transition from the HBO service via route 64 may be automatic or transparent to the subscriber, with the possible exception of the identification that the transition of the services has occurred. However, if the Encore service is also not authorized, the SAM 37 will report this fact to the navigator 35 after accessing the authorization database 47, as in step 104. The navigator 35 will then ask for an alternate service to the Encore service, and continue until an authorized alternate service is reported by the SAM 37 (steps 90-112). Continuing with this non-limiting example, if the subscriber is not authorized for the Pay-Per-View alternate service (the alternative service to Encore referenced by pointer 65), the service table may route or may point to a default barker service via pointer 66 which generally informs the subscriber that channel 9 is not a service option available to that subscriber within his or her viewing plan. If none of the alternate services are authorized, the navigator 35 will display a default unauthorized service message to the subscriber, as in step 114. It should be apparent to one of ordinary skill in the art that the routing of services is not confined to movie services or channels, but rather that the routing of one service to another may be configured by the system operator at the headend 11 so that similar services may be routed from services that are either premium channels or more desirable services at premium prices.

Figure 7:
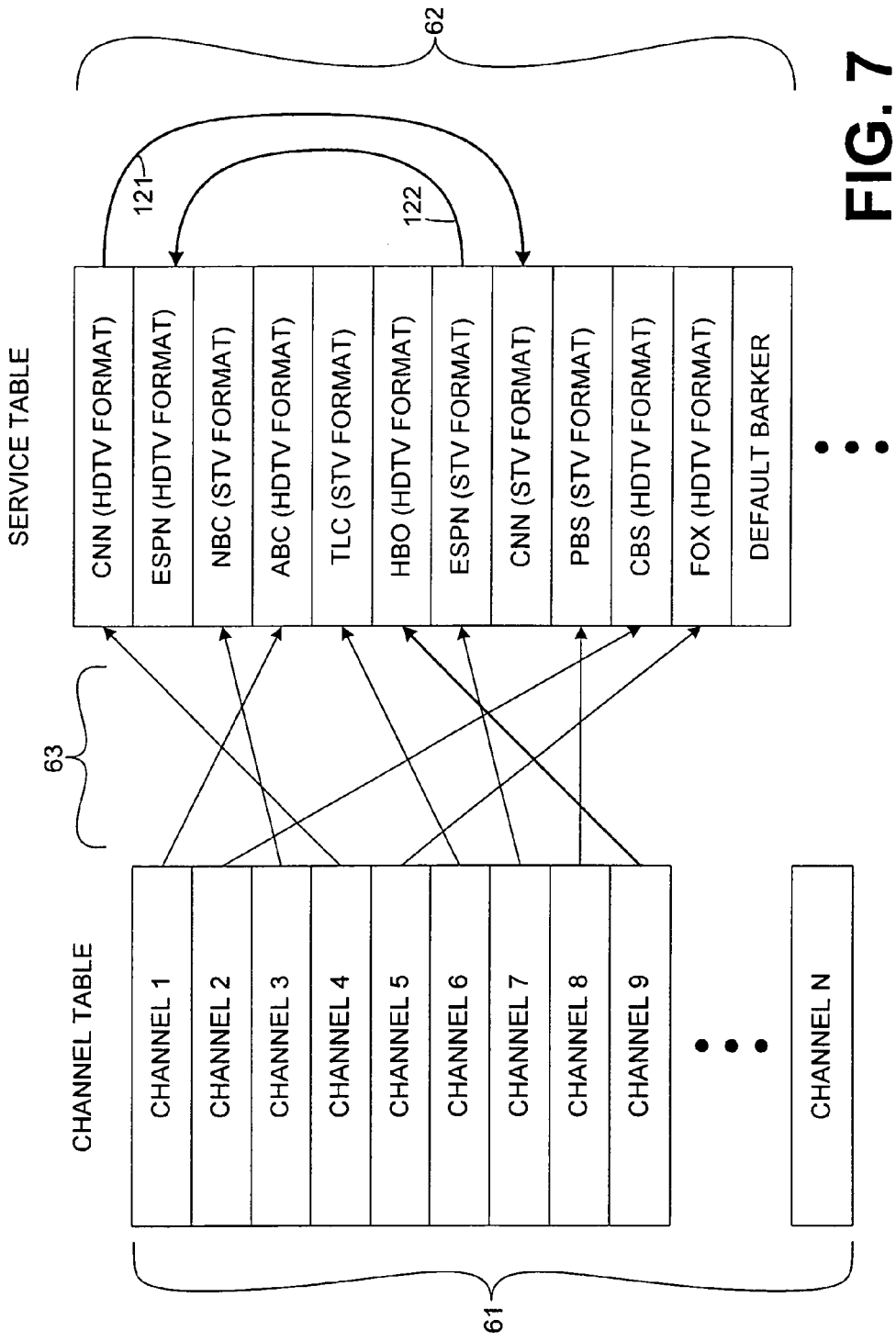
FIG. 7 is a diagram of another example of an alternative service scheme stored in memory of the DHCT shown in FIG. 2.

In an alternative embodiment, the DHCT 16 may be programmed or configured to properly present data to a display 21 configured for high definition television ("HDTV"). A problem with channel mapping arises with the advent of HDTV for subscribers who may or may not have HDTV viewing capabilities. FIG. 7 is a diagram of alternative services where the alternative services are different viewing formats rather than different services altogether as discussed above.

A subscriber identifies with the navigator 35, using an interactive settings GUI, such as a configuration setting, the type of television set display 21 that is connected to the DHCT 16, such as an HDTV or a standard television ("STV"). In normal operation, SAM 37 is informed of dual or multiple carried services or programs through the service information 61, 62 that identifies the services. Multiple SAM 37 services for the different programming configurations (such as for HDTV and STV) are defined and transmitted throughout the network 20.

In one embodiment, the channel line-up exposed to a subscriber is automatically composed for and limited to the subscriber's display type. The application that displays program data to the subscriber for viewing selection (hereinafter referred to as the interactive program guide (IPG) (not shown) is provisioned to limit display of program data to only those channels compatible to the subscriber's TV format. Thus, the IPG must retrieve from the SAM 37 which channels or programs are available to the subscriber based on the subscriber's TV format. The navigator 35 using the SAM 37 also limits the subscriber to tuning to only those channels that are suitable to the subscriber's display type.

In an alternative embodiment, the navigator 35 allows a subscriber to request display of any channel and the alternate service authorization mechanism described previously is used to activate the service that provides the appropriate format. A conditional access "key" is defined for the HDTV format, and embedded in the service definition for HDTV services. Those services are mapped to the channels. The alternate service for each of the HDTV services is the standard format service. Thus, if a subscriber has an STV display 21 but attempts to tune to an HDTV service, the navigator 35 and SAM 37 use the alternate service mechanism described earlier to ultimately activate the standard service.

FIG. 7 is a diagram of an example of channel mapping scheme stored in memory of the DHCT 16 shown in FIG. 2 which depicts routing between HDTV and STV formats. The system operator at the headend 11 may map channels 63 between the channel table 61 and the service table 62 such that some of the services 62 are programmed for HDTV and others are not. The SAM 37 includes a "multiple-feed attribute" bitmap where a "one" value in the bit corresponding to a service indicates a multiple-carried service. A list of pointers 63, organized in sequential order, contain pointers to a service table 62 corresponding to the channels in the channel table 61. The service table 62 may contain information pertaining to the number of feeds, respective source IDs, and respective picture format. As a result, the mapping 63 to the channel table 61 may be such that, in normal operation, the subscriber is otherwise presented viewing of channels that are programmed in HDTV format even though the subscriber's television is not capable of viewing that type of service, which could result in system failure or improper operation. However, if the subscriber configures the DHCT 16 for the type of television set 21 that is connected to the DHCT 16, navigator 35 and SAM 37 will transparently tune to the services of the appropriate format. As a result, each time the subscriber attempts to tune a channel in the channel table 61 that is mapped 63 to a service in the service table 62 which is programmed in HDTV format, the alternative service mapping may automatically route the service from the HDTV format to STV format which the subscriber's display 21 may be able to show.

As a non-limiting example, as shown in FIG. 7, if a subscriber desires to watch CNN, which is a multi-carried program, the subscriber may choose to input channel 4 into the remote 27. If the subscriber has pre-configured the DHCT 16 for a STV display device 21 as opposed to an HDTV television device, the navigator 35 will be informed by the SAM 37 that the HDTV service is not authorized. The navigator 35 will then query the SAM 37 for the alternate unauthorized service, which the SAM 37, via pointer 121, will report as the STV version of CNN. The navigator 35 will query the SAM 37 and determine that the STV CNN service is authorized, and will thus direct the SAM 37 to activate the STV version of CNN so that the display 21 will be able to present the selection to the subscriber. Conversely, if the subscriber does possess an HDTV display device 21 and has configured the DHCT 16 for presenting HDTV programming, then the navigator 35 will simply activate the HDTV service. If the subscriber wishes to view, for example, ESPN and inputs channel 7 to the DHCT 16, the SAM 37 would automatically route from the service ESPN which is in STV format via the pointer 122 to the ESPN service in HDTV format in a seamless fashion so that the subscriber does not experience delay in the transition.

Some channel attributes are shared for the different formats of a particular service. Thus, service table 62 may include multiple services with the same broadcast logo or same channel station call letters if the services are offered in multiple feeds. Alternatively, different versions of the attributes may be used to indicate different levels of service. Thus, the basic "NBC" call letters may be implemented for the NBC service in STV format while "NBC-HD" may be used to signify the NBC feed in HDTV format.

In still another alternative embodiment, the SAM 37 receives from the SAM server 56 the information required for a watch TV application a service parameter such that any number of display formats and their corresponding sources are identified. For example, a service for CNN may be defined whereby the service application includes a watch TV application that supports multiple feeds and the service parameter would include the multiple sources and a designation of the display type for each source. When activated by the SAM 37, the watch TV application would check the configuration of the DHCT 16 and tune the source corresponding to the supported display 21.

Alternative services, as discussed above, additionally include modification of services or feeds for presentation of information in different formats or in enhanced formats from the original feed. As a non-limiting example, if the target channel chosen by the subscriber is a single feed regardless of whether the format is suitable for the subscriber's display 21, a format conversion takes place in the DHCT 16 to scale the picture display to match the subscriber's TV format. Hence, a singly-carried channel or program, regardless of the format, does not prevent reception and display of the program but forces a number of format conversion operations that result in a converted picture.

The DHCT 16 is capable of receiving all MPEG-2 (Motion Picture Experts Group second standard), MP/HL (Main Profile, High Level), and MP/ML (Main Profile, Main Level) formats to decode any of these compressed digital video signals but maybe limited to produce a single video format as its output. The DHCT 16 performs any and all conversion operations necessary to display video on a single TV set configured, for example, as a STV. Thus, a service formatted for HDTV would be converted to STV format if it was a single feed so that the subscriber could view the service. Likewise, STV formatted services could be converted to HDTV format for subscribers with HDTV displays 21. The result is that the DHCT 16 presents the highest quality image available to the display coupled to the DHCT 16 as determined by the configuration set by the subscriber.

Other subscriber equipment can also cause alternative services to be implemented for reasons in addition to unauthorization or HDTV/STV as discussed above. As a non-limiting example, different models of DHCTs in the network 20 may render execution of certain applications unavailable for a variety of reasons. For example, the processor 24 in an older model DHCT 16 may operate too slowly to execute a new application, so the older model DHCT 16 would implement an alternative service referenced by the new application. In this example, the alternative service would be compatible to the capabilities of the older model DHCT 16 with the slower processor 24. Other subscriber equipment such as video cassette recorders and certain types of television sets 21 may place technical restrictions on the type of applications that the DHCT 16 may execute and thereby require implementation for alternative services compatible to a subscriber's equipment. It should be obvious to one of ordinary skill that alternative services can be implemented by the DHCT 16 for various reasons, and not just for the few examples as described above.

The alternative service program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The invention claimed is:

1. A method for a client device with a processor and memory that is coupled to a server device to provide a subscriber an alternative service upon accessing an unauthorized service, comprising the steps of:
   receiving from the server device and storing in the memory a service database and an authorization database, wherein the service database includes a channel table referencing a plurality of services corresponding to a plurality of channels and a service table defining the plurality of services and including the definition of alternate services assigned to at least one of the plurality of services, and wherein the authorization database includes a list of authorizations individual to the subscriber and corresponding to the plurality of services;
   accessing the service database responsive to the subscriber attempting to access a desired channel to determine a first service corresponding to the desired channel;
   determining whether the subscriber is authorized for the first service according to the authorization database, wherein the client device presents the first service to the subscriber on a display device responsive to the authorization database revealing that the subscriber is authorized for the first service; and
   presenting one of the alternate services according to the service database responsive to the subscriber being unauthorized to receive the first service.

2. The method of claim 1, further comprising the step of:
   instructing a service application manager client in the client device to receive the service database and the authorization database from the server device.

3. The method of claim 2, further comprising the step of:
   instructing a navigation module in the client device to receive the desired channel request, wherein the navigation module polls the service application manager client to determine the first service that corresponds to the desired channel.

4. The method of claim 3, further comprising the step of:
   instructing the service application manager client to access the service database, wherein the service application manager client communicates to the navigation module the first service corresponding to the desired channel.

5. The method of claim 4, further comprising the step of:
   instructing the navigation module to poll the service application manager client to determine whether the subscriber is authorized to receive the first service.

6. The method of claim 5, further comprising the step of:
   instructing the service application manager client to access the authorization database contained on a service application manager database, wherein the service application manager client communicates to the navigation module an authorization status for the subscriber corresponding to the first service.

7. The method of claim 6, further comprising the step of:
   instructing the navigation module to present the first service on the display device if the authorization status denotes that the subscriber is authorized to receive the first service.

8. The method of claim 6, further comprising the step of:
   instructing the navigation module to poll the service application manager client to determine the one of the alternate services to the first service if the authorization status denotes that the subscriber is not authorized to receive the first service.

9. The method of claim 6, wherein the navigation module presents the one of the alternate services on the display device if the service application manager client communicates to the navigation module that the one of the alternate services is authorized for the subscriber.

10. The method of claim 1, wherein the first service is an enhanced version of a basic service, and wherein the enhanced version includes one or more functions not provided by the basic service.

11. The method of claim 10, wherein one of the functions of the enhanced version of the basic service is an ability to record and save the first service in the memory.

12. The method of claim 10, wherein one of the functions of the enhanced version of the basic service is an ability to pause, stop, resume, replay, rewind, and fast-forward the first service on a real-time basis.

13. The method of claim 1, wherein a first user input requesting to activate the first service corresponds to a request for a first television channel associated with the first service and wherein responsive to the first user input a tuner in the client device is tuned to a single television channel to provide a second service, said single television channel being different than the first television channel.

14. The method of claim 10, wherein one of the functions of the enhanced version of the basic service is an ability to present the first service with a superior audio quality.

15. The method of claim 1, further comprising the step of utilizing a pointer to assign the alternate services.

16. The method of claim 1, further comprising the step of mapping at least one of the alternate services to one of the other services of the plurality of services.

17. The method of claim 1, wherein defining the alternate services is performed by assigning one of the services to another of the services which are other than adjacent to one another within the service table.

18. A system for a client device with a processor and memory that is coupled to a server device to provide a subscriber an alternative service upon accessing an unauthorized service, comprising:

logic configured to receive from said server device and store in said memory a service database and an authorization database, wherein said service database includes a channel table referencing a plurality of services corresponding to a plurality of channels and a service table defining said plurality of services and including the definition of alternate services assigned to at least one of the plurality of services, and wherein said authorization database includes a list of authorizations individual to said subscriber and corresponding to said plurality of services;

logic configured to access said service database responsive to said subscriber attempting to access a desired channel to determine a first service corresponding to said desired channel;

logic configured to determine whether said subscriber is authorized for said first service according to said authorization database, wherein said client device presents said first service to said subscriber on a display device responsive to said authorization database revealing that said subscriber is authorized for said first service; and logic configured to present one of the alternate services according to said service database responsive to said subscriber being unauthorized to receive said first service.

19. The system of claim 18, further comprising:
logic configured to implement a service application manager client in said client device to receive said service database and said authorization database from said server device.

20. The system of claim 19, further comprising:
logic configured to implement a navigation module in said client device to receive said desired channel request, wherein said navigation module polls said service application manager client to determine said first service that corresponds to said desired channel.

21. The system of claim 20, further comprising:
logic configured to implement said service application manager client to access said service database contained on a service application manager database, wherein said service application manager client communicates to said navigation module said first service corresponding to said desired channel.

22. The system of claim 21, further comprising:
logic configured to implement said navigation module to poll said service application manager client to determine whether said subscriber is authorized to receive said first service.

23. The system of claim 22, further comprising:
logic configured to implement said service application manager client to access said authorization database contained on said service application manager database, wherein said service application manager client communicates to said navigation module an authorization status for said subscriber corresponding to said first service.

24. The system of claim 23, further comprising:
logic configured to implement said navigation module to present said first service on said display device if said authorization status denotes that said subscriber is authorized to receive said first service.

25. The system of claim 23, further comprising:
logic configured to implement said navigation module to poll said service application manager client to determine the one of the alternate services to said first service if said authorization status denotes that said subscriber is not authorized to receive said first service.

26. The system of claim 23, wherein said navigation module presents the one of the alternate services on said display device if said service application manager client communicates to said navigation module that the one of the alternate services is authorized for said subscriber.

27. The system of claim 18, wherein the first service is an enhanced version of a basic service, and wherein the enhanced version includes one or more functions not provided by the basic service.

28. The system of claim 27, wherein one of the functions of the enhanced version of the basic service is an ability to record and save the first service in the memory.

29. The system of claim 27, wherein one of the functions of the enhanced version of the basic service is an ability to pause, stop, resume, replay, rewind, and fast-forward the first service on a real-time basis.

30. The system of claim 27, wherein one of the functions of the enhanced version of the basic service is an ability to present the first service with a superior audio quality.

31. The system of claim 18, wherein a pointer is utilized to assign the alternate services.

32. The system of claim 18, wherein one service of the service table is mapped to another service of the service table to define the one of the alternate services.

33. The system of claim 32, wherein the one service is other than adjacent to the other service within the service table.

34. The system of claim 33, wherein one of the services of the plurality of services and the one of the alternate services assigned to the one service are other than in sequential order relative to one another within the service table.

* * * * *